United States Patent
Smit et al.

(10) Patent No.: US 9,555,832 B2
(45) Date of Patent: Jan. 31, 2017

(54) DISPLAY SYSTEM UTILIZING VEHICLE AND TRAILER DYNAMICS

(71) Applicant: Ford Global Technologies, LLC, Dearborn, MI (US)

(72) Inventors: David Dean Smit, Ann Arbor, MI (US); Matthew Y. Rupp, Canton, MI (US); Roger Arnold Trombley, Ann Arbor, MI (US); Thomas Edward Pilutti, Ann Arbor, MI (US); John Shutko, Ann Arbor, MI (US); Douglas Scott Rhode, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 14/314,376

(22) Filed: Jun. 25, 2014

(65) Prior Publication Data

US 2014/0309888 A1 Oct. 16, 2014

Related U.S. Application Data

(63) Continuation-in-part of application No. 14/294,489, filed on Jun. 3, 2014, now Pat. No. 9,335,162, which
(Continued)

(51) Int. Cl.
*B62D 13/06* (2006.01)
*B62D 15/02* (2006.01)
(Continued)

(52) U.S. Cl.
CPC ............. *B62D 13/06* (2013.01); *B62D 15/027* (2013.01); *B62D 15/028* (2013.01);
(Continued)

(58) Field of Classification Search
CPC ..... B62D 13/06; B62D 15/025; B62D 15/027; B62D 15/0275; B62D 15/0285; B62D 15/029; B62D 15/0295
See application file for complete search history.

(56) References Cited

U.S. PATENT DOCUMENTS 3,542,390 A    11/1970   Fikse
3,605,088 A    9/1971   Savelli
(Continued)

FOREIGN PATENT DOCUMENTS

CN     101610420 A    12/2009
CN     101833869 A     9/2010
(Continued)

OTHER PUBLICATIONS

Lueke, Stefan, Machine translation of above DE102005045196A1, abstract, specification and claims, Sep. 28, 2006.*
(Continued)

*Primary Examiner* — Dale W Hilgendorf
(74) *Attorney, Agent, or Firm* — Raymond Coppiellie; Price Heneveld LLP

(57) ABSTRACT

A display system for a vehicle and trailer is disclosed. The system comprises an interface configured to receive a directional input and a controller in communication with the interface and a screen. The controller is operable to receive a hitch angle and determine a heading direction of the trailer. The controller is further operable to determine a predicted heading of the vehicle aligned with the trailer based on the hitch angle. The predicted heading of the trailer is then displayed by the controller on the screen.

20 Claims, 9 Drawing Sheets

Related U.S. Application Data is a continuation-in-part of application No. 14/257,420, filed on Apr. 21, 2014, which is a continuation-in-part of application No. 14/256,427, filed on Apr. 18, 2014, which is a continuation-in-part of application No. 14/249,781, filed on Apr. 10, 2014, now Pat. No. 9,374,562, which is a continuation-in-part of application No. 14/188,213, filed on Feb. 24, 2014, which is a continuation-in-part of application No. 13/847,508, filed on Mar. 20, 2013, and a continuation-in-part of application No. 14/068,387, filed on Oct. 31, 2013, now Pat. No. 9,102,271, which is a continuation-in-part of application No. 14/059,835, filed on Oct. 22, 2013, now Pat. No. 9,248,858, which is a continuation-in-part of application No. 13/443,743, filed on Apr. 10, 2012, now Pat. No. 8,825,328, which is a continuation-in-part of application No. 13/336,060, filed on Dec. 23, 2011, now Pat. No. 8,909,426, said application No. 14/249,781 is a continuation-in-part of application No. 14/161,832, filed on Jan. 23, 2014, now Pat. No. 9,346,396, which is a continuation-in-part of application No. 14/059,835, filed on Oct. 22, 2013, now Pat. No. 9,248,858, said application No. 14/249,781 is a continuation-in-part of application No. 14/201,130, filed on Mar. 7, 2014, now Pat. No. 9,290,202, which is a continuation-in-part of application No. 14/068,387, filed on Oct. 31, 2013, now Pat. No. 9,102,271.

(60) Provisional application No. 61/477,132, filed on Apr. 19, 2011.

(51) Int. Cl.
*B60W 30/00* (2006.01)
*H04N 7/18* (2006.01)
*G01B 21/22* (2006.01)

(52) U.S. Cl.
CPC ....... *B62D 15/029* (2013.01); *B62D 15/0275* (2013.01); *B62D 15/0295* (2013.01); *B60W 30/00* (2013.01); *G01B 21/22* (2013.01); *H04N 7/183* (2013.01)

(56) References Cited

U.S. PATENT DOCUMENTS

| | | |
|---|---|---|
| 3,756,624 A | 9/1973 | Taylor |
| 3,833,928 A | 9/1974 | Gavit et al. |
| 3,860,257 A | 1/1975 | Mesly |
| 3,924,257 A | 12/1975 | Roberts |
| 4,042,132 A | 8/1977 | Bohman et al. |
| 4,044,706 A * | 8/1977 | Gill ................. B60Q 1/425 116/28 R |
| 4,277,804 A | 7/1981 | Robison |
| 4,430,637 A | 2/1984 | Koch-Ducker et al. |
| 4,735,432 A | 4/1988 | Brown |
| 4,752,080 A | 6/1988 | Rogers |
| 4,846,094 A | 7/1989 | Woods |
| 4,848,499 A | 7/1989 | Martinet et al. |
| 4,897,642 A | 1/1990 | DiLullo et al. |
| 4,947,097 A | 8/1990 | Tao |
| 5,001,639 A | 3/1991 | Breen |
| 5,097,250 A | 3/1992 | Hernandez |
| 5,108,158 A | 4/1992 | Breen |
| 5,132,851 A | 7/1992 | Bomar et al. |
| 5,155,683 A | 10/1992 | Rahim |
| 5,191,328 A | 3/1993 | Nelson |
| 5,235,316 A | 8/1993 | Qualizza |
| 5,246,242 A | 9/1993 | Penzotti |
| 5,247,442 A | 9/1993 | Kendall |
| 5,455,557 A | 10/1995 | Noll et al. |
| 5,461,357 A | 10/1995 | Yoshioka et al. |
| 5,521,633 A | 5/1996 | Nakajima et al. |
| 5,586,814 A | 12/1996 | Steiner |
| 5,650,764 A | 7/1997 | McCullough |
| 5,690,347 A | 11/1997 | Juergens et al. |
| 5,734,336 A | 3/1998 | Smithline |
| 5,781,662 A | 7/1998 | Mori et al. |
| 5,905,433 A | 5/1999 | Wortham |
| 5,947,588 A | 9/1999 | Huang |
| 5,951,035 A | 9/1999 | Phillips, Jr. et al. |
| 5,957,232 A | 9/1999 | Shimizu et al. |
| 5,999,091 A | 12/1999 | Wortham |
| 6,041,582 A | 3/2000 | Tiede et al. |
| 6,042,196 A | 3/2000 | Nakamura et al. |
| 6,056,371 A | 5/2000 | Lin et al. |
| 6,100,795 A | 8/2000 | Otterbacher et al. |
| 6,142,372 A | 11/2000 | Wright |
| 6,178,650 B1 | 1/2001 | Thibodeaux |
| 6,182,010 B1 | 1/2001 | Berstis |
| 6,198,992 B1 | 3/2001 | Winslow |
| 6,226,226 B1 | 5/2001 | Lill et al. |
| 6,292,094 B1 | 9/2001 | Deng et al. |
| 6,318,747 B1 | 11/2001 | Ratican |
| 6,351,698 B1 | 2/2002 | Kubota et al. |
| 6,366,202 B1 | 4/2002 | Rosenthal |
| 6,409,288 B2 | 6/2002 | Yoshida et al. |
| 6,411,898 B2 | 6/2002 | Ishida et al. |
| 6,434,486 B1 | 8/2002 | Studt et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,526,335 B1 | 2/2003 | Treyz et al. |
| 6,567,731 B2 | 5/2003 | Chandy |
| 6,573,833 B1 | 6/2003 | Rosenthal |
| 6,577,952 B2 | 6/2003 | Geier et al. |
| 6,580,984 B2 | 6/2003 | Fecher et al. |
| 6,587,760 B2 | 7/2003 | Okamoto |
| 6,604,592 B2 | 8/2003 | Pietsch et al. |
| 6,643,576 B1 | 11/2003 | O Connor et al. |
| 6,683,539 B2 | 1/2004 | Trajkovic et al. |
| 6,801,125 B1 | 10/2004 | McGregor et al. |
| 6,816,765 B2 | 11/2004 | Yamamoto et al. |
| 6,837,432 B2 | 1/2005 | Tsikos et al. |
| 6,838,979 B2 | 1/2005 | Deng et al. |
| 6,847,916 B1 | 1/2005 | Ying |
| 6,854,557 B1 | 2/2005 | Deng et al. |
| 6,857,494 B2 | 2/2005 | Kobayashi et al. |
| 6,933,837 B2 | 8/2005 | Gunderson et al. |
| 6,959,970 B2 | 11/2005 | Tseng |
| 6,970,184 B2 | 11/2005 | Hirama et al. |
| 6,989,739 B2 | 1/2006 | Li |
| 7,005,974 B2 | 2/2006 | McMahon et al. |
| 7,026,957 B2 | 4/2006 | Rubenstein |
| 7,032,705 B2 | 4/2006 | Zheng et al. |
| 7,039,504 B2 | 5/2006 | Tanaka et al. |
| 7,047,117 B2 | 5/2006 | Akiyama et al. |
| 7,085,634 B2 | 8/2006 | Endo et al. |
| 7,089,101 B2 | 8/2006 | Fischer et al. |
| 7,117,077 B2 | 10/2006 | Michi et al. |
| 7,136,754 B2 | 11/2006 | Hahn et al. |
| 7,139,650 B2 | 11/2006 | Lubischer |
| 7,142,098 B2 | 11/2006 | Lang et al. |
| 7,154,385 B2 | 12/2006 | Lee et al. |
| 7,161,616 B1 | 1/2007 | Okamoto et al. |
| 7,165,820 B2 | 1/2007 | Rudd, III |
| 7,175,194 B2 | 2/2007 | Ball |
| 7,195,267 B1 | 3/2007 | Thompson |
| 7,204,504 B2 | 4/2007 | Gehring et al. |
| 7,207,041 B2 | 4/2007 | Elson et al. |
| 7,219,913 B2 | 5/2007 | Atley |
| 7,220,217 B2 | 5/2007 | Tamai et al. |
| 7,225,891 B2 | 6/2007 | Gehring et al. |
| 7,229,139 B2 | 6/2007 | Lu et al. |
| 7,237,790 B2 | 7/2007 | Gehring et al. |
| 7,239,958 B2 | 7/2007 | Grougan et al. |
| 7,266,435 B2 | 9/2007 | Wang et al. |
| 7,309,075 B2 | 12/2007 | Ramsey et al. |

(56) References Cited

U.S. PATENT DOCUMENTS

| | | |
|---|---|---|
| 7,310,084 B2 | 12/2007 | Shitanaka et al. |
| 7,315,299 B2 | 1/2008 | Sunda et al. |
| 7,319,927 B1 | 1/2008 | Sun et al. |
| 7,352,388 B2 | 4/2008 | Miwa et al. |
| 7,353,110 B2 | 4/2008 | Kim |
| 7,366,892 B2 | 4/2008 | Spaur et al. |
| 7,401,871 B2 | 7/2008 | Lu et al. |
| 7,425,889 B2 | 9/2008 | Widmann et al. |
| 7,451,020 B2 | 11/2008 | Goetting et al. |
| 7,463,137 B2 | 12/2008 | Wishart et al. |
| 7,505,784 B2 | 3/2009 | Barbera |
| 7,532,109 B2 | 5/2009 | Takahama et al. |
| 7,537,256 B2 | 5/2009 | Gates et al. |
| 7,552,009 B2 | 6/2009 | Nelson |
| 7,568,716 B2 | 8/2009 | Dietz |
| 7,602,782 B2 | 10/2009 | Doviak et al. |
| 7,619,680 B1 | 11/2009 | Bingle et al. |
| 7,623,952 B2 | 11/2009 | Unruh et al. |
| 7,640,108 B2 | 12/2009 | Shimizu et al. |
| 7,658,524 B2 | 2/2010 | Johnson et al. |
| 7,689,253 B2 | 3/2010 | Basir |
| 7,690,737 B2 | 4/2010 | Lu |
| 7,692,557 B2 | 4/2010 | Medina et al. |
| 7,693,661 B2 | 4/2010 | Iwasaka |
| 7,715,953 B2 | 5/2010 | Shepard |
| 7,777,615 B2 | 8/2010 | Okuda |
| 7,783,699 B2 | 8/2010 | Rasin et al. |
| 7,786,849 B2 | 8/2010 | Buckley |
| 7,793,965 B2 | 9/2010 | Padula |
| 7,801,941 B2 | 9/2010 | Conneely et al. |
| 7,825,782 B2 | 11/2010 | Hermann |
| 7,827,047 B2 | 11/2010 | Anderson et al. |
| 7,840,347 B2 | 11/2010 | Noguchi |
| 7,904,222 B2 | 3/2011 | Lee et al. |
| 7,907,975 B2 | 3/2011 | Sakamoto et al. |
| 7,917,081 B2 | 3/2011 | Voto et al. |
| 7,932,623 B2 | 4/2011 | Burlak et al. |
| 7,932,815 B2 | 4/2011 | Martinez et al. |
| 7,950,751 B2 | 5/2011 | Offerle et al. |
| 7,969,326 B2 | 6/2011 | Sakakibara |
| 7,974,444 B2 | 7/2011 | Hongo |
| 8,009,025 B2 | 8/2011 | Engstrom et al. |
| 8,010,252 B2 | 8/2011 | Getman et al. |
| 8,010,253 B2 | 8/2011 | Lundquist |
| 8,019,592 B2 | 9/2011 | Fukuoka et al. |
| 8,024,743 B2 | 9/2011 | Werner |
| 8,033,955 B2 | 10/2011 | Farnsworth |
| 8,036,792 B2 | 10/2011 | Dechamp |
| 8,037,500 B2 | 10/2011 | Margis et al. |
| 8,038,166 B1 | 10/2011 | Piesinger |
| 8,044,776 B2 | 10/2011 | Schofield et al. |
| 8,044,779 B2 | 10/2011 | Hahn et al. |
| 8,068,019 B2 | 11/2011 | Bennie et al. |
| 8,108,116 B2 | 1/2012 | Mori et al. |
| 8,121,802 B2 | 2/2012 | Grider et al. |
| 8,131,458 B1 | 3/2012 | Zilka |
| 8,140,138 B2 | 3/2012 | Chrumka |
| 8,150,474 B2 | 4/2012 | Saito et al. |
| 8,165,770 B2 | 4/2012 | Getman et al. |
| 8,169,341 B2 | 5/2012 | Toledo et al. |
| 8,170,726 B2 | 5/2012 | Chen et al. |
| 8,174,576 B2 | 5/2012 | Akatsuka et al. |
| 8,179,238 B2 | 5/2012 | Roberts, Sr. et al. |
| 8,192,064 B2 | 6/2012 | Johnson et al. |
| 8,195,145 B2 | 6/2012 | Angelhag |
| 8,205,704 B2 | 6/2012 | Kadowaki et al. |
| 8,223,204 B2 * | 7/2012 | Hahn .................. B62D 13/06 348/120 |
| 8,244,442 B2 | 8/2012 | Craig et al. |
| 8,245,270 B2 | 8/2012 | Cooperstein et al. |
| 8,255,007 B2 | 8/2012 | Saito et al. |
| 8,260,518 B2 | 9/2012 | Englert |
| 8,267,485 B2 | 9/2012 | Barlsen et al. |
| 8,270,933 B2 | 9/2012 | Riemer et al. |
| 8,280,607 B2 | 10/2012 | Gatti et al. |
| 8,308,182 B2 | 11/2012 | Ortmann et al. |
| 8,310,353 B2 | 11/2012 | Hinninger et al. |
| 8,315,617 B2 | 11/2012 | Tadayon et al. |
| 8,319,618 B2 | 11/2012 | Gomi et al. |
| 8,319,663 B2 | 11/2012 | Von Reyher et al. |
| 8,332,097 B2 | 12/2012 | Chiba et al. |
| 8,352,575 B2 | 1/2013 | Samaha |
| 8,362,888 B2 | 1/2013 | Roberts, Sr. et al. |
| 8,370,056 B2 | 2/2013 | Trombley et al. |
| 8,374,749 B2 | 2/2013 | Tanaka |
| 8,380,416 B2 | 2/2013 | Offerle et al. |
| 8,390,696 B2 | 3/2013 | Komoto et al. |
| 8,392,066 B2 | 3/2013 | Ehara et al. |
| 8,401,744 B2 | 3/2013 | Chiocco |
| 8,406,956 B2 | 3/2013 | Wey et al. |
| 8,414,171 B2 | 4/2013 | Kawamura |
| 8,417,263 B2 | 4/2013 | Jenkins et al. |
| 8,417,417 B2 | 4/2013 | Chen et al. |
| 8,417,444 B2 | 4/2013 | Smid et al. |
| 8,430,792 B2 | 4/2013 | Noll |
| 8,451,107 B2 | 5/2013 | Lu et al. |
| 8,469,125 B2 | 6/2013 | Yu et al. |
| 8,471,691 B2 | 6/2013 | Zhang et al. |
| 8,473,575 B2 | 6/2013 | Marchwicki et al. |
| 8,494,439 B2 | 7/2013 | Faenger |
| 8,498,757 B2 | 7/2013 | Bowden et al. |
| 8,538,785 B2 | 9/2013 | Coleman et al. |
| 8,548,680 B2 | 10/2013 | Ryerson et al. |
| 8,560,175 B2 | 10/2013 | Bammert et al. |
| 8,571,758 B2 | 10/2013 | Klier et al. |
| 8,626,382 B2 | 1/2014 | Obradovich |
| 8,755,982 B2 | 6/2014 | Heckel et al. |
| 8,755,984 B2 | 6/2014 | Rupp et al. |
| 8,786,417 B2 | 7/2014 | Holmen et al. |
| 8,788,204 B2 | 7/2014 | Shimizu |
| 8,797,190 B2 | 8/2014 | Kolbe et al. |
| 8,807,261 B2 | 8/2014 | Subrt et al. |
| 8,811,698 B2 | 8/2014 | Kono et al. |
| 8,836,786 B2 | 9/2014 | Seger et al. |
| 8,868,329 B2 | 10/2014 | Ikeda et al. |
| 8,892,360 B2 | 11/2014 | Otani |
| 8,928,757 B2 | 1/2015 | Maekawa et al. |
| 8,930,140 B2 | 1/2015 | Trombley et al. |
| 9,008,913 B1 | 4/2015 | Sears et al. |
| 9,013,286 B2 | 4/2015 | Chen et al. |
| 9,042,603 B2 | 5/2015 | Elwart et al. |
| 9,082,315 B2 | 7/2015 | Lin et al. |
| 9,094,583 B2 | 7/2015 | Shih et al. |
| 9,114,832 B2 | 8/2015 | Wang et al. |
| 9,120,359 B2 | 9/2015 | Chiu et al. |
| 9,180,890 B2 | 11/2015 | Lu et al. |
| 9,315,151 B2 | 4/2016 | Taylor et al. |
| 9,315,212 B1 | 4/2016 | Kyrtsos et al. |
| 9,335,162 B2 | 5/2016 | Kyrtsos et al. |
| 9,340,228 B2 | 5/2016 | Xu et al. |
| 9,352,777 B2 * | 5/2016 | Lavoie .................. B62D 13/06 |
| 2001/0037164 A1 | 11/2001 | Hecker |
| 2001/0052434 A1 | 12/2001 | Ehrlich et al. |
| 2002/0005780 A1 | 1/2002 | Ehrlich et al. |
| 2002/0098853 A1 | 7/2002 | Chrumka |
| 2002/0111118 A1 | 8/2002 | Klitsner et al. |
| 2003/0079123 A1 | 4/2003 | Mas Ribes |
| 2003/0147534 A1 | 8/2003 | Ablay et al. |
| 2003/0222982 A1 | 12/2003 | Hamdan et al. |
| 2003/0234512 A1 | 12/2003 | Holub |
| 2004/0119822 A1 | 6/2004 | Custer et al. |
| 2004/0203660 A1 | 10/2004 | Tibrewal et al. |
| 2004/0207525 A1 | 10/2004 | Wholey et al. |
| 2004/0260438 A1 | 12/2004 | Chernetsky et al. |
| 2005/0000738 A1 | 1/2005 | Gehring et al. |
| 2005/0073433 A1 | 4/2005 | Gunderson et al. |
| 2005/0074143 A1 | 4/2005 | Kawai |
| 2005/0091408 A1 | 4/2005 | Parupudi et al. |
| 2005/0128059 A1 | 6/2005 | Vause |
| 2005/0146607 A1 | 7/2005 | Linn et al. |
| 2005/0168331 A1 | 8/2005 | Gunderson |
| 2005/0177635 A1 | 8/2005 | Schmidt et al. |
| 2005/0206225 A1 | 9/2005 | Offerle et al. |
| 2005/0206231 A1 | 9/2005 | Lu et al. |

(56) References Cited

U.S. PATENT DOCUMENTS

| | | |
|---|---|---|
| 2005/0206299 A1 | 9/2005 | Nakamura et al. |
| 2005/0236201 A1 | 10/2005 | Spannheimer et al. |
| 2005/0236896 A1 | 10/2005 | Offerle et al. |
| 2006/0071447 A1 | 4/2006 | Gehring et al. |
| 2006/0076828 A1 | 4/2006 | Lu et al. |
| 2006/0092129 A1 | 5/2006 | Choquet et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0156315 A1 | 7/2006 | Wood et al. |
| 2006/0171704 A1 | 8/2006 | Bingle et al. |
| 2006/0190097 A1 | 8/2006 | Rubenstein |
| 2006/0238538 A1 | 10/2006 | Kapler et al. |
| 2006/0250501 A1 | 11/2006 | Widmann et al. |
| 2006/0276959 A1 | 12/2006 | Matsuoka et al. |
| 2006/0287821 A1 | 12/2006 | Lin |
| 2006/0293800 A1 | 12/2006 | Bauer et al. |
| 2007/0019421 A1 | 1/2007 | Kregness et al. |
| 2007/0027581 A1 | 2/2007 | Bauer et al. |
| 2007/0058273 A1 | 3/2007 | Ito et al. |
| 2007/0132560 A1 | 6/2007 | Nystrom et al. |
| 2007/0132573 A1 | 6/2007 | Quach et al. |
| 2007/0198190 A1 | 8/2007 | Bauer et al. |
| 2007/0216136 A1 | 9/2007 | Dietz |
| 2007/0260395 A1 | 11/2007 | Matsuoka et al. |
| 2008/0027599 A1 | 1/2008 | Logan et al. |
| 2008/0027635 A1 | 1/2008 | Tengler et al. |
| 2008/0147277 A1 | 6/2008 | Lu et al. |
| 2008/0148374 A1 | 6/2008 | Spaur et al. |
| 2008/0177443 A1 | 7/2008 | Lee et al. |
| 2008/0180526 A1 | 7/2008 | Trevino |
| 2008/0186384 A1 | 8/2008 | Ishii et al. |
| 2008/0231701 A1* | 9/2008 | Greenwood ........... B62D 13/06 348/148 |
| 2008/0312792 A1 | 12/2008 | Dechamp |
| 2008/0313050 A1 | 12/2008 | Basir |
| 2009/0005932 A1 | 1/2009 | Lee et al. |
| 2009/0045924 A1 | 2/2009 | Roberts, Sr. et al. |
| 2009/0063053 A1 | 3/2009 | Basson et al. |
| 2009/0075624 A1 | 3/2009 | Cox et al. |
| 2009/0079828 A1 | 3/2009 | Lee et al. |
| 2009/0082935 A1 | 3/2009 | Leschuk et al. |
| 2009/0085775 A1 | 4/2009 | Otsuka et al. |
| 2009/0093928 A1 | 4/2009 | Getman et al. |
| 2009/0106036 A1 | 4/2009 | Tamura et al. |
| 2009/0117890 A1 | 5/2009 | Jacobsen et al. |
| 2009/0140064 A1 | 6/2009 | Schultz et al. |
| 2009/0157260 A1 | 6/2009 | Lee |
| 2009/0198425 A1 | 8/2009 | Englert |
| 2009/0219147 A1 | 9/2009 | Bradley et al. |
| 2009/0231441 A1 | 9/2009 | Walker et al. |
| 2009/0253466 A1 | 10/2009 | Saito et al. |
| 2009/0271078 A1 | 10/2009 | Dickinson |
| 2009/0300701 A1 | 12/2009 | Karaguz et al. |
| 2009/0306854 A1 | 12/2009 | Dechamp |
| 2009/0306861 A1 | 12/2009 | Schumann et al. |
| 2009/0318119 A1 | 12/2009 | Basir et al. |
| 2009/0326775 A1 | 12/2009 | Nishida |
| 2010/0060739 A1 | 3/2010 | Salazar |
| 2010/0063670 A1 | 3/2010 | Brzezinski et al. |
| 2010/0098853 A1 | 4/2010 | Hoffmann et al. |
| 2010/0114471 A1 | 5/2010 | Sugiyama et al. |
| 2010/0152989 A1 | 6/2010 | Smith et al. |
| 2010/0156667 A1 | 6/2010 | Bennie et al. |
| 2010/0156671 A1 | 6/2010 | Lee et al. |
| 2010/0157061 A1 | 6/2010 | Katsman et al. |
| 2010/0171828 A1 | 7/2010 | Ishii |
| 2010/0174422 A1 | 7/2010 | Jacobsen et al. |
| 2010/0191421 A1 | 7/2010 | Nilsson |
| 2010/0198491 A1 | 8/2010 | Mays |
| 2010/0222964 A1 | 9/2010 | Dechamp |
| 2010/0234071 A1 | 9/2010 | Shabtay et al. |
| 2010/0305815 A1 | 12/2010 | Trueman et al. |
| 2010/0306309 A1 | 12/2010 | Santori et al. |
| 2010/0324770 A1 | 12/2010 | Ramsey et al. |
| 2011/0001825 A1 | 1/2011 | Hahn |
| 2011/0022282 A1 | 1/2011 | Wu et al. |
| 2011/0025482 A1 | 2/2011 | Alguera et al. |
| 2011/0050903 A1 | 3/2011 | Vorobiev |
| 2011/0063425 A1 | 3/2011 | Tieman |
| 2011/0087398 A1 | 4/2011 | Lu et al. |
| 2011/0088659 A1 | 4/2011 | Wang et al. |
| 2011/0102583 A1 | 5/2011 | Kinzalow |
| 2011/0110530 A1 | 5/2011 | Kimura |
| 2011/0112721 A1 | 5/2011 | Wang et al. |
| 2011/0112762 A1 | 5/2011 | Gruijters et al. |
| 2011/0125457 A1 | 5/2011 | Lee et al. |
| 2011/0129093 A1 | 6/2011 | Karam et al. |
| 2011/0140872 A1 | 6/2011 | McClure |
| 2011/0149077 A1 | 6/2011 | Robert |
| 2011/0153198 A1 | 6/2011 | Kokkas et al. |
| 2011/0160956 A1 | 6/2011 | Chung et al. |
| 2011/0181457 A1 | 7/2011 | Basten |
| 2011/0185390 A1 | 7/2011 | Faenger et al. |
| 2011/0195659 A1 | 8/2011 | Boll et al. |
| 2011/0216199 A1 | 9/2011 | Trevino et al. |
| 2011/0257860 A1 | 10/2011 | Getman et al. |
| 2011/0281522 A1 | 11/2011 | Suda |
| 2011/0296037 A1 | 12/2011 | Westra et al. |
| 2012/0004805 A1 | 1/2012 | Gray et al. |
| 2012/0041658 A1 | 2/2012 | Turner |
| 2012/0062743 A1 | 3/2012 | Lynam et al. |
| 2012/0062744 A1 | 3/2012 | Schofield et al. |
| 2012/0065815 A1 | 3/2012 | Hess |
| 2012/0079002 A1 | 3/2012 | Boll et al. |
| 2012/0084292 A1 | 4/2012 | Liang et al. |
| 2012/0086808 A1 | 4/2012 | Lynam |
| 2012/0095649 A1 | 4/2012 | Klier et al. |
| 2012/0170286 A1 | 7/2012 | Bodem et al. |
| 2012/0185131 A1* | 7/2012 | Headley ................ B62D 13/06 701/41 |
| 2012/0191285 A1 | 7/2012 | Woolf et al. |
| 2012/0200706 A1 | 8/2012 | Greenwood et al. |
| 2012/0221168 A1 | 8/2012 | Zeng et al. |
| 2012/0229639 A1 | 9/2012 | Singleton |
| 2012/0265416 A1 | 10/2012 | Lu et al. |
| 2012/0271512 A1 | 10/2012 | Rupp et al. |
| 2012/0271514 A1 | 10/2012 | Lavoie et al. |
| 2012/0271515 A1* | 10/2012 | Rhode .................... B62D 13/06 701/41 |
| 2012/0283909 A1 | 11/2012 | Dix |
| 2012/0283910 A1 | 11/2012 | Lee et al. |
| 2012/0288156 A1 | 11/2012 | Kido |
| 2012/0290150 A1 | 11/2012 | Doughty et al. |
| 2012/0310594 A1 | 12/2012 | Watanabe |
| 2012/0314073 A1 | 12/2012 | Shimoda et al. |
| 2012/0316732 A1 | 12/2012 | Auer |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0038436 A1 | 2/2013 | Brey et al. |
| 2013/0038731 A1 | 2/2013 | Brey et al. |
| 2013/0041524 A1 | 2/2013 | Brey |
| 2013/0057397 A1 | 3/2013 | Cutler |
| 2013/0076007 A1 | 3/2013 | Goode |
| 2013/0120572 A1 | 5/2013 | Kwon |
| 2013/0148748 A1 | 6/2013 | Suda |
| 2013/0158803 A1* | 6/2013 | Headley ................ B62D 13/06 701/41 |
| 2013/0158863 A1* | 6/2013 | Skvarce ................. B62D 13/06 701/428 |
| 2013/0179038 A1 | 7/2013 | Goswami et al. |
| 2013/0226390 A1 | 8/2013 | Luo et al. |
| 2013/0250114 A1 | 9/2013 | Lu |
| 2013/0253814 A1 | 9/2013 | Wirthlin |
| 2013/0268160 A1 | 10/2013 | Trombley et al. |
| 2014/0005918 A1 | 1/2014 | Qiang |
| 2014/0012465 A1 | 1/2014 | Shank et al. |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |

(56) References Cited

U.S. PATENT DOCUMENTS

| | | |
|---|---|---|
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0074743 A1 | 3/2014 | Rademaker |
| 2014/0085472 A1 | 3/2014 | Lu et al. |
| 2014/0088797 A1 | 3/2014 | McClain et al. |
| 2014/0088824 A1 | 3/2014 | Ishimoto |
| 2014/0121930 A1 | 5/2014 | Allexi et al. |
| 2014/0156148 A1 | 6/2014 | Kikuchi |
| 2014/0160276 A1 | 6/2014 | Pliefke et al. |
| 2014/0168415 A1 | 6/2014 | Ihlenburg et al. |
| 2014/0172232 A1 | 6/2014 | Rupp et al. |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0267868 A1 | 9/2014 | Mazzola et al. |
| 2014/0267869 A1 | 9/2014 | Sawa |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0307095 A1 | 10/2014 | Wierich |
| 2014/0324295 A1 | 10/2014 | Lavoie et al. |
| 2014/0343795 A1 | 11/2014 | Lavoie |
| 2014/0354811 A1 | 12/2014 | Weber |
| 2014/0361955 A1 | 12/2014 | Goncalves |
| 2014/0379217 A1 | 12/2014 | Rupp et al. |
| 2015/0002669 A1 | 1/2015 | Reed et al. |
| 2015/0002670 A1 | 1/2015 | Bajpai |
| 2015/0025732 A1 | 1/2015 | Min et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0094945 A1 | 4/2015 | Cheng et al. |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0142211 A1 | 5/2015 | Shehata et al. |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0172582 A1 | 6/2015 | Kiyohara et al. |
| 2015/0179075 A1 | 6/2015 | Lee |
| 2015/0191200 A1 | 7/2015 | Tsubaki et al. |
| 2015/0197278 A1 | 7/2015 | Boos et al. |
| 2015/0203156 A1 | 7/2015 | Hafner et al. |
| 2015/0210317 A1 | 7/2015 | Hafner et al. |
| 2015/0217693 A1 | 8/2015 | Pliefke et al. |
| 2015/0232031 A1 | 8/2015 | Kitaura et al. |
| 2015/0234386 A1 | 8/2015 | Zini et al. |
| 2015/0269444 A1 | 9/2015 | Lameyre et al. |
| 2016/0009288 A1 | 1/2016 | Yu |
| 2016/0023603 A1 | 1/2016 | Vico et al. |
| 2016/0152263 A1 | 6/2016 | Singh et al. |
| 2016/0153778 A1 | 6/2016 | Singh et al. |

FOREIGN PATENT DOCUMENTS

| | | | |
|---|---|---|---|
| CN | 201923085 U | 8/2011 | |
| CN | 202159367 U | 3/2012 | |
| CN | 202541524 U | 11/2012 | |
| CN | 102582686 B | 9/2013 | |
| CN | 203292137 U | 11/2013 | |
| DE | 3931518 A1 | 4/1991 | |
| DE | 9208595 U1 | 8/1992 | |
| DE | 19526702 A1 | 2/1997 | |
| DE | 10065230 A1 | 7/2002 | |
| DE | 10154612 A1 | 5/2003 | |
| DE | 102005045196 A1 * | 9/2006 | ............ B62D 13/06 |
| DE | 102005043466 A1 * | 3/2007 | ............ B62D 13/06 |
| DE | 102005043467 A1 | 3/2007 | |
| DE | 102005043468 A1 | 3/2007 | |
| DE | 102006002294 A1 | 7/2007 | |
| DE | 102006035021 | 1/2008 | |
| DE | 102006048947 A1 | 4/2008 | |
| DE | 102008020838 A1 | 11/2008 | |
| DE | 102007029413 A1 | 1/2009 | |
| DE | 102008045436 A1 | 3/2010 | |
| DE | 102006035021 B4 | 4/2010 | |
| DE | 102008043675 A1 | 5/2010 | |
| DE | 102009007990 A1 | 8/2010 | |
| DE | 102009012253 A1 | 9/2010 | |
| DE | 102010004920 A1 | 7/2011 | |
| DE | 102010006323 A1 | 8/2011 | |
| DE | 102008004158 B4 | 10/2011 | |
| DE | 102008004159 B4 | 10/2011 | |
| DE | 102008004160 B4 | 10/2011 | |
| DE | 102010021052 A1 | 11/2011 | |
| DE | 102010029184 A1 | 11/2011 | |
| DE | 102011104256 A1 | 7/2012 | |
| DE | 102011101990 B3 | 10/2012 | |
| DE | 102011108440 A1 | 1/2013 | |
| DE | 102011120814 A1 | 6/2013 | |
| DE | 102012019234 A1 | 4/2014 | |
| EP | 0418653 A1 | 3/1991 | |
| EP | 0849144 A2 | 6/1998 | |
| EP | 1245445 A2 | 10/2002 | |
| EP | 1361543 A2 | 11/2003 | |
| EP | 1442931 A2 | 8/2004 | |
| EP | 1655191 A1 | 5/2006 | |
| EP | 1695888 A2 | 8/2006 | |
| EP | 1593552 B1 | 3/2007 | |
| EP | 1810913 A1 | 7/2007 | |
| EP | 2168815 A1 | 3/2010 | |
| EP | 2199188 A2 | 6/2010 | |
| EP | 2388180 A2 | 11/2011 | |
| EP | 2431225 A1 | 3/2012 | |
| EP | 2452549 A1 | 5/2012 | |
| EP | 2551132 A1 | 1/2013 | |
| EP | 2644477 A1 | 10/2013 | |
| EP | 1569073 B1 | 9/2014 | |
| EP | 2803944 A2 | 11/2014 | |
| FR | 2515379 A1 | 10/1981 | |
| FR | 2515379 A1 | 4/1983 | |
| FR | 2606717 A1 | 5/1988 | |
| FR | 2716145 A1 | 8/1995 | |
| FR | 2786456 A1 | 6/2000 | |
| FR | 2980750 A1 | 4/2013 | |
| GB | 2265587 A | 10/1993 | |
| GB | 2342630 A | 4/2000 | |
| GB | 2398048 A | 8/2004 | |
| GB | 2398049 A | 8/2004 | |
| GB | 2398050 A * | 8/2004 | ............ B62D 13/06 |
| JP | 63-085568 | 6/1988 | |
| JP | 06-028598 A | 4/1994 | |
| JP | 08289286 A | 11/1996 | |
| JP | 09267762 A | 10/1997 | |
| JP | 10119739 A | 5/1998 | |
| JP | 2000267181 A | 9/2000 | |
| JP | 2002012172 A | 1/2002 | |
| JP | 2002068032 A | 3/2002 | |
| JP | 2003148938 A | 5/2003 | |
| JP | 2003175852 A | 6/2003 | |
| JP | 2004114879 A | 4/2004 | |
| JP | 3716722 B2 | 11/2005 | |
| JP | 2008027138 A | 2/2008 | |
| JP | 2008123028 A | 5/2008 | |
| JP | 2009171122 A | 7/2009 | |
| JP | 2012105158 A | 5/2012 | |
| JP | 2012166580 A | 9/2012 | |
| JP | 2012166647 A | 9/2012 | |
| JP | 2014002056 A | 1/2014 | |
| JP | 2014034289 A | 2/2014 | |
| KR | 20060012710 A | 2/2006 | |

(56) References Cited

FOREIGN PATENT DOCUMENTS

| | | | |
|---|---|---|---|
| KR | 1020060012710 A | 2/2006 |
| KR | 20060133750 A | 12/2006 |
| KR | 1020070034729 A | 3/2007 |
| KR | 20110114897 A | 10/2011 |
| KR | 20140105199 A | 9/2014 |
| TW | 200930010 A | 7/2009 |
| WO | 8503263 A1 | 8/1985 |
| WO | 0044605 A1 | 8/2000 |
| WO | 2011117372 A1 | 9/2011 |
| WO | 2012059207 A1 | 5/2012 |
| WO | 2012103193 A1 | 8/2012 |
| WO | 2013048994 A1 | 4/2013 |
| WO | 2013070539 A1 | 5/2013 |
| WO | 2013081984 A1 | 6/2013 |
| WO | 2013186208 A2 | 12/2013 |
| WO | 2014006500 A2 | 1/2014 |
| WO | 2014019730 A1 | 2/2014 |
| WO | 2014037500 A1 | 3/2014 |
| WO | 2014123575 A1 | 8/2014 |
| WO | 2015074027 A1 | 5/2015 |

OTHER PUBLICATIONS

Espacenet translation of DE102005043466A1, Published Mar. 15, 2007, Wirnitzer et al, Daimler Chrysler, 15 total pages, abstract, desorption, claims and figures.*
Haviland, G.S., "Automatic Brake Control for Trucks—What Good Is It?", TRID, Society of Automotive Engineers, Sep. 1968, 1 pg.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pgs.
Claudio Altafini; Alberto Speranzon; Karl Henrik Johansson, "Hybrid Control of a Truck and Trailer Vehicle", Springer-Verlag Berlin Heidelberg, HSCC 2002, LNCS 2289; 2002, pp. 21-34.
Divelbiss, A.W.; Wen, J.T.; "Trajectory Tracking Control of a Car-Trailer System", IEEE, Control Systems Technology, Aug. 6, 2002, vol. 5, No. 3, 1 pg.
Guanrong, Chen; Delin, Zhang, "Backing up a Truck-Trailer with Suboptimal Distance Trajectories", IEEE, Proceedings of the Fifth IEEE International Conference, vol. 2, Aug. 6, 2002, New Orleans, LA, ISBN:0-7803-3645-3, 1 pg.
"Understanding Tractor-Trailer Performance", Caterpillar, 2006, pp. 1-28.
Lundquist, C.; Reinelt, W.; Enqvist O., "Back Driving Assistant for Passenger Cars with Trailer", ZF Lenksysteme GmbH, Schwäbisch Gmünd, Germany, 2006 (SAE Int'l) Jan. 2006, pp. 1-8.
Enqvist, O., "AFS-Assisted Trailer Reversing," Institutionen för systemteknik Deartment of Electrical Engineering, Jan. 27, 2006, 57 pgs.
Pradalier C.; Usher, K., "Robust Trajectory Tracking for a Reversing Tractor-Trailer System", (Draft), Field and Service Robotics Conference, CSIRO ICT Centre, Jul. 2007, 16 pages.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 30, 2007, 1 pg.
Pradalier, C.; Usher, K., "Experiments in Autonomous Reversing of a Tractor-Trailer System", 6th International Conference on Field and Service Robotics, inria-00195700, Version 1, Dec. 2007, 10 pgs.
Zhe Leng; Minor, M., "A Simple Tractor-Trailer Backing Control Law for Path Following", IEEE, Intelligent Robots and Systems {IROS} IEEE/RSJ International Conference, Oct. 2010, 2 pgs.
"2012 Edge—Trailer Towing Selector", Brochure, Preliminary 2012 RV & Trailer Towing Guide Information, 2011, 3 pgs.
"Ford Super Duty: Truck Technologies", Brochure, Sep. 2011, 2 pgs.
J. Roh; H. Lee; W. Chung, "Control of a Car with a Trailer Using the Driver Assistance System", IEEE, International Conference on Robotics and Biomimetics; Phuket, Thailand, Dec. 2011, 1 pg.

Payne, M.L.; Hung, J.Y.; Bevy, D.M, "Control of a Robot-Trailer System Using a Single Non-Collacted Sensor", IEEE, 38th Annual Conference on IEEE Industrial Electronics Society, Oct. 25-28, 2012, 2 pgs.
"Optionally Unmanned Ground Systems for any Steering-Wheel Based Vehicle" Universal. Unmanned., Kairos Autonomi, website: http://www.kairosautonomi.com/pronto4_system.html, retrieved Sep. 26, 2014, 2 pgs.
Steele, M.; Gillespie, R.B., "Shared Control Between Human and Machine: Using a Haptic Steering Wheel to Aid in Land Vehicle Guidance", University of Michigan, Date Unknown, 5 pgs.
Kristopher Bunker, "2012 Guide to Towing", Trailer Life, 2012, pp. 1-42.
"iBall Wireless Trailer Hitch Camera", Product Listing, Amazon, Nov. 2, 2010, pp. 1-5.
M. Wagner, D. Zoebel, and A. Meroth, "An Adaptive Software and Systems Architecture for Driver Assistance Systems Based on Service Orientation" International Journal of Machine Learning and Computing, Oct. 2011, vol. 1, No. 4, pp. 359-365.
"Surround View System", ASL—Vision 360, 2010, pp. 1.
Jae Il Roh, Hyunsuk Lee, Woojin Chung, "Control of a Car with a Trailer Using the Driver Assistance System", IEEE, International Conference on Robotics and Biomimetics, Dec. 7-11, 2011; Phuket, Thailand, pp. 2890-2895.
Young Jin Lee, Sung Won Park, Hyeun Cheol Cho, Dong Seop Han, Geun Jo Han, and Kwon Soon Lee; "Development of Auto Alignment System Between Trailer and Freight Wagon Using Electronic Sensors for Intermodal Transportation" IEEE, 2010, pp. 1211-1215.
"Back-Up and Utility Light System", Back-Up Buddy Inc., Plainville, MA, pp. 1-2; date unknown.
Ford Motor Company, "09 F-150", Brochure, www.fordvehicles.com, pp. 1-30.
Michael Paine, "Heavy Vehicle Object Detection Systems", Vehicle Design and Research Pty Lmited for VicRoads, Jun. 2003, pp. 1-22.
A.M.C. Odhams; R.L. Roebuck; C. Cebon, "Implementation of Active Steering on a Multiple Trailer Long Combination Vehicle", Cambridge University, Engineering Department; Cambridge, United Kingdom, pp. 1-13; date unknown.
Dougloas Newcomb, "Range Rover Evoque's Surround Camera System", Tech Feature Friday, Article, Jun. 15, 2012, pp. 1-2.
"Trailer Vision", Trailer Vision Ltd., Brochure, www.trailervision.co.uk, pp. 1-4; date unknown.
Micah Steele, R. Brent, Gillespie, "Shared Control Between Human and Machine: Using a Haptic Steering Wheel to Aid in Land Vehicle Guidance", University of Michigan, pp. 1-5; date unknown.
Laszlo Palkovics, Pal Michelberger, Jozsef Bokor, Peter Gaspar, "Adaptive Identification for Heavy-Truck Stability Control", Vehicle Systems Dynamics Supplement, vol. 25, No. sup1, 1996, pp. 502-518.
David Hodo, John Hung, Bob Selfridge, Andrew Schwartz, "Robotic DGM Tow Vehicle Project Overview", Auburn University, US Army Corp of Engineers, pp. 1-9; date unknown.
"Convenience and Loadspace Features" Jaguar Land Rover Limited, 2012, pp. 1-15, http://www.landrover.com/us/en/lr/all-new-range-rover/explore/.
"Rearview Parking Assist Systems", Donmar Sunroofs & Accessories, Brochure, Aug. 2013, pp. 1-13.
"Alpine Electronics Introduces Two New Drive Assist Solutions", Alpine Electronics of America, Inc., Jan. 7, 2010, pp. 1-2.
"Delphi Lane Departure Warning", Delphi Corporation, Troy, Michigan pp. 1-2; date unknown.
Jesus Morales, Anthony Mandow, Jorge L. Martinez, and Alfonso Garcia-Cerezo, "Driver Assistance System for Backward Maneuvers in Passive Multi-trailer Vehicles", International Conference on Intelligent Robots and Systems (IROS), Oct. 7-12, 2012, pp. 4853-4858.
"The Vehicle Rear Lighting System for Safe Driving in Reverse", White Night Rear Lighting Systems, Cruiser Stainless Accessories, pp. 1-3; date unknown.
"Ford Super Duty: Truck Technology", Brochure, www.media.ford.com, Sep. 2011, pp. 1-2.
"Ford Guide to Towing", Trailer Life, Magazine, 2012, pp. 1-38.

(56) References Cited

OTHER PUBLICATIONS

"Dodge Dart: The Hot Compact Car", Brochure, www.dart-mouth. com/enginerring-development.html, pp. 1-6; date unknown.
M. Wagner, D. Zoebel, and A. Meroth, "Adaptive Software and Systems Architecture for Driver Assistance Systems" International Journal of Machine Learning and Computing, Oct. 2011, vol. 1, No. 4, pp. 359-365.
Christian Lundquist, Wolfgang Reinelt, Olof Enqvist, "Back Driving Assistant for Passenger Cars with Trailer", SAE Int'l, ZF Lenksysteme Gmbh, Schwaebisch Gmuend, Germany, 2006, pp. 1-8.
Divelbiss, A.W.; Wen, J.T.; "Trajectory Tracking Control of a Car-Trailer System", IEEE, Control Systems Technology, Aug. 6, 2002, vol. 5, No. 3, ISSN: 1063-6536, pp. 269-278.
Stahn, R.; Heiserich, G.; Stopp, A.; "Laser Scanner-Based Navigation for Commercial Vehicles", IEEE, Intelligent Vehicles Symposium, Jun. 2007, pp. 969-974, print ISBN: 1931-0587.
Widrow, B.; Lamego, M.M.; "Neurointerfaces: Applications", IEEE, Adaptive Systems for Signal Processing, Communications, and Control Symposium, Oct. 2000, pp. 441-444.
Dieter Zoebel, David Polock, Philipp Wojke, "Steering Assistance for Backing Up Articulated Vehicles", Systemics, Cybernetics and Informatics, Universitaet Koblenz-Landau, Germany, vol. 1, No. 5, pp. 101-106; date unknown.
Stephen K. Young, Carol A. Eberhard, Philip J. Moffa, "Development of Performance Specifications for Collision Avoidance Systems for Lane Change, Merging and Backing", TRW Space and Electronics Group, Feb. 1995, pp. 1-31.
Ford Motor Company, "09 F-150", Brochure, www.fordvehicles. com, pp. 1-30; date unknown.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.
"2012 Edge—Trailer Towing Selector", Brochure, Preliminary 2012 RV & Trailer Towing Guide Information, pp. 1-3.
"Meritor Wabco Reverse Detection Module for Trailers with 12-Volt Constant Power Systems", Technical Bulletin, TP-02172, Revised Oct. 2004, pp. 1-8.
Simonoff, Adam J., "USH0001469 Remotely Piloted Vehicle Control and Interface System", Aug. 1, 1995, pp. 1-7.
"Range Rover Evoque's Surround Camera System"; MSN Douglas Newcomb Jun. 15, 2012, pp. 1-2.
"Electronic Trailer Steering", VSE, Advanced Steering & Suspension Solutions, Brochure, 2009, The Netherlands, pp. 1-28.
"WABCO Electronic Braking System—New Generation", Vehicle Control Systems—An American Standard Company, www.wabco-auto.com, 2004, pp. 1-8.
T. Wang, "Reverse-A-Matic-Wheel Direction Sensor System Operation and Installation Manual", Dec. 15, 2005, pp. 1-9.
"Wireless-Enabled Microphone, Speaker and User Interface for a Vehicle", The IP.com, Aug. 26, 2004, pp. 1-5, IP.com disclosure No. IPCOM000030782D.
"RFID Read/Write Module", Grand Idea Studio, 2013, pp. 1-3, website, http://www.grandideastudio.com/portfolio/rfid-read-write-module/.
Micah Steele, R. Brent Gillespie, "Shared Control Between Human and Machine: Using a Haptic Steering Wheel to Aid in Land Vehicle Guidance", University of Michigan, pp. 1-5; date unknown.
"Electric Power Steering", Toyota Hybrid System Diagnosis-Course 072, Section 7, pp. 1-10; date unknown.
"Telematics Past, Present, and Future," Automotive Service Association, www.ASAshop.org, May 2008, 20 pgs.
"Fully Automatic Trailer Tow Hitch With LIN Bus," https://webista.bmw.com/webista/show?id=1860575499&lang=engb&print=1, pp. 1-5; date unknown.
Nüsser, Renë; Pelz, Rodolfo Mann, "Bluetooth-based Wireless Connectivity in an Automotive Environment", VTC, 2000, pp. 1935-1942.
Whitfield, Kermit, "A Hitchhiker's Guide to the Telematics Ecosystem", Automotive Design & Production, Oct. 1, 2003, 3 pgs.
Narasimhan, N.; Janssen, C.; Pearce, M.; Song, Y., "A Lightweight Remote Display Management Protocol for Mobile Devices", 2007, IEEE, pp. 711-715.
Microsoft, Navigation System, Sync Powered by Microsoft, Ford Motor Company, Jul. 2007, 164 pgs.
Microsoft, Supplemental Guide, Sync Powered by Microsoft, Ford Motor Company, Nov. 2007, 86 pgs.
Voelcker, J., "Top 10 Tech Cars: It's the Environment, Stupid", IEEE Spectrum, Apr. 2008, pp. 26-35.
Microsoft, Navigation System, Sync Powered by Microsoft, Ford Motor Company, Oct. 2008, 194 pgs.
Microsoft, Supplemental Guide, Sync Powered by Microsoft, Ford Motor Company, Oct. 2008, 83 pgs.
Microsoft, Navigation System, Sync Powered by Microsoft, Ford Motor Company, Jul. 2009, 196 pgs.
Microsoft, Navigation System, Sync Powered by Microsoft, Ford Motor Company, Jul. 2009,196 pgs.
Sh.azadi et al., Automatic Parking of an Articulated Vehicle Using ANFIS, Global Journal of Science, Engineering and Technology, GJSET Publishing, 2013, Issue 14, 2013, pp. 93-104.
F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.
Hwang, Jung-Hoon; et al., "Mobile Robots at Your Fingertip: Bezier Curve On-Line Trajectory Generation for Supervisory Control," Intl. Conference on Intelligent Robots and Systems, Oct. 2003, pp. 1444-1449, Las Vegas, Nevada.
M. Khatib et al., "Dynamic Path Modification for Car-Like Nonholonomic Mobile Robots," International Conference on Robotics and Automation, Apr. 1997, pp. 2920-2925, Albuquerque, New Mexico.

\* cited by examiner

DISPLAY SYSTEM UTILIZING VEHICLE AND TRAILER DYNAMICS

CROSS-REFERENCE TO RELATED APPLICATIONS

This patent application is a continuation-in-part of U.S. patent application Ser. No. 14/294,489, which was filed on Jun. 3, 2014, entitled "TRAILER LENGTH ESTIMATION IN HITCH ANGLE APPLICATIONS," which is a continuation-in-part of U.S. patent application Ser. No. 14/257,420 which was filed on Apr. 21, 2014, entitled "TRAJECTORY PLANNER FOR A TRAILER BACKUP ASSIST SYSTEM," which is a continuation-in-part of U.S. patent application Ser. No. 14/256,427, which was filed on Apr. 18, 2014, entitled "CONTROL FOR TRAILER BACKUP ASSIST SYSTEM," which is a continuation-in-part of U.S. patent application Ser. No. 14/249,781, which was filed on Apr. 10, 2014, entitled "SYSTEM AND METHOD FOR CALCULATING A HORIZONTAL CAMERA TO TARGET DISTANCE," which is a continuation-in-part of U.S. patent application Ser. No. 14/188,213, which was filed on Feb. 24, 2014, entitled "SENSOR SYSTEM AND METHOD FOR MONITORING TRAILER HITCH ANGLE," which is a continuation-in-part of U.S. patent application Ser. No. 13/847,508, which was filed on Mar. 20, 2013, entitled "HITCH ANGLE ESTIMATION." U.S. patent application Ser. No. 14/188,213 is also a continuation-in-part of U.S. patent application Ser. No. 14/068,387, which was filed on Oct. 31, 2013, entitled "TRAILER MONITORING SYSTEM AND METHOD," which is a continuation-in-part of U.S. patent application Ser. No. 14/059,835, which was filed on Oct. 22, 2013, entitled "TRAILER BACKUP ASSIST SYSTEM," which is a continuation-in-part of U.S. patent application Ser. No. 13/443,743 which was filed on Apr. 10, 2012, entitled "DETECTION OF AND COUNTERMEASURES FOR JACKKNIFE ENABLING CONDITIONS DURING TRAILER BACKUP ASSIST," which is a continuation-in-part of U.S. patent application Ser. No. 13/336,060, which was filed on Dec. 23, 2011, entitled "TRAILER PATH CURVATURE CONTROL FOR TRAILER BACKUP ASSIST," which claims benefit from U.S. Provisional Patent Application No. 61/477,132, which was filed on Apr. 19, 2011, entitled "TRAILER BACKUP ASSIST CURVATURE CONTROL." U.S. patent application Ser. No. 14/249,781 is also a continuation-in-part of U.S. patent application Ser. No. 14/161,832 which was filed Jan. 23, 2014, entitled "SUPPLEMENTAL VEHICLE LIGHTING SYSTEM FOR VISION BASED TARGET DETECTION," which is a continuation-in-part of U.S. patent application Ser. No. 14/059,835 which was filed on Oct. 22, 2013, entitled "TRAILER BACKUP ASSIST SYSTEM." Furthermore, U.S. patent application Ser. No. 14/249,781 is a continuation-in-part of U.S. application Ser. No. 14/201,130 which was filed on Mar. 7, 2014, entitled "SYSTEM AND METHOD OF CALIBRATING A TRAILER BACKUP ASSIST SYSTEM," which is a continuation-in-part of U.S. patent application Ser. No. 14/068,387, which was filed on Oct. 31, 2013, entitled "TRAILER MONITORING SYSTEM AND METHOD." The aforementioned related applications are hereby incorporated by reference in their entirety.

FIELD OF THE INVENTION

The disclosure relates generally to a display system for a vehicle, and more particularly, to a display system configured to display feedback information to an operator of a vehicle when backing up a trailer.

BACKGROUND OF THE INVENTION

Reversing a vehicle while towing a trailer is very challenging for many drivers. This is particularly true for drivers that are unskilled at backing vehicles with attached trailers, which may include those that drive with a trailer on an infrequent basis (e.g., have rented a trailer, use a personal trailer on an infrequent basis, etc.). One reason for such difficulty is that backing a vehicle with an attached trailer requires steering inputs that are opposite to normal steering when backing the vehicle without a trailer attached. Another reason for such difficulty is that small errors in steering while backing a vehicle with an attached trailer are amplified thereby causing the trailer to depart from a desired path.

SUMMARY OF THE INVENTION

According to one aspect of the present invention, a display system for a vehicle and trailer is disclosed. The system comprises an interface configured to receive a directional input and a controller in communication with the interface and a screen. The controller is operable to receive a hitch angle and determine a heading direction of the trailer. The controller is further operable to determine a predicted heading of the vehicle aligned with the trailer based on the hitch angle. The predicted heading of the trailer is then displayed by the controller on the screen.

According to another aspect of the present invention, a vehicle and trailer system is disclosed. The system comprises a controller in communication with a screen and at least one imaging device. The controller is operable to receive a hitch angle corresponding to a connection between the vehicle and the trailer. The controller is further operable to display an image on the screen comprising graphics demonstrating a current trajectory of the trailer and a predicted trajectory of the vehicle and the trailer. The predicted trajectory is predicted in response to a driver requested input.

According to a further aspect of the present invention, a method for monitoring a trailer trajectory is disclosed. The method comprises monitoring a hitch angle between the vehicle and the trailer. Based on the hitch angle and a steering angle of the vehicle, the method further includes displaying a trailer heading direction on a screen. Further, based on the hitch angle and the steering angle, the method continues to determine a predicted heading of the vehicle and trailer in a substantially aligned configuration and display the predicted heading on the screen.

These and other aspects, objects, and features of the present invention will be understood and appreciated by those skilled in the art upon studying the following specification, claims, and appended drawings.

DETAILED DESCRIPTION OF THE PREFERRED EMBODIMENTS

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

The disclosed subject matter is directed to providing trailer backup assist functionality in a manner that is relatively low cost and that offers an intuitive user interface. In particular, such trailer backup assist functionality provides for controlling curvature of a path of travel of a trailer attached to a vehicle (i.e., trailer path curvature control by allowing a driver of the vehicle to specify a desired path of the trailer by inputting a desired trailer path curvature as the backup maneuver of the vehicle and trailer progresses). The various systems and methods disclosed herein provide visual information to the operator of a trailer backup assist system. The various implementations introduced herein may provide information to the operator of the vehicle to predict a straightened trajectory of the vehicle and the trailer while the vehicle and trailer are turning in a reverse direction.

Figure 1:
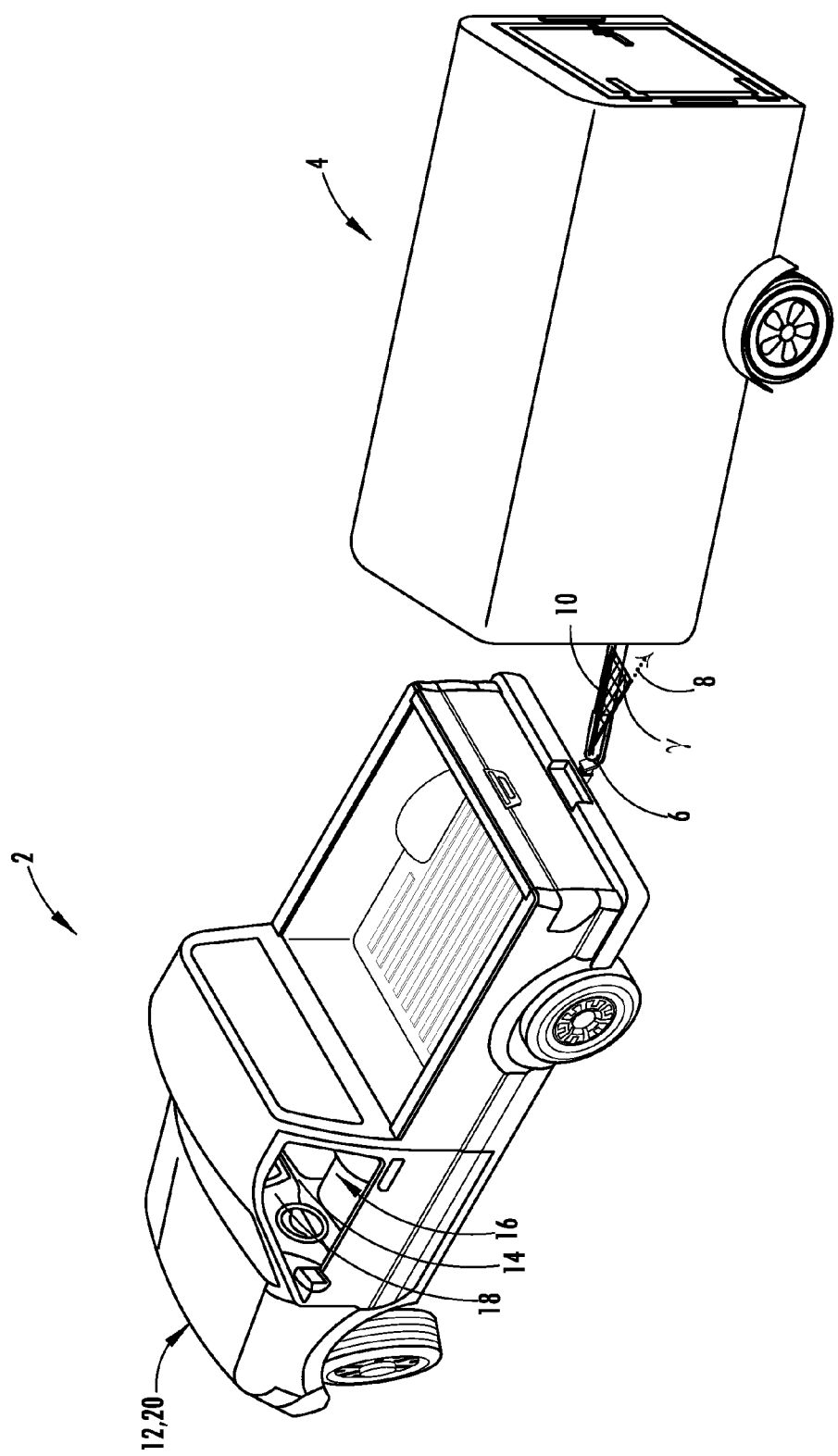
FIG. 1 is a perspective view of a vehicle and a trailer comprising a trailer backup assist system.

Referring to FIG. 1, a schematic diagram illustrating a vehicle 2 coupled to a trailer 4 is shown in accordance with the disclosure. The vehicle 2 and the trailer 4 are coupled about a hitch point 6 and are shown in a turning configuration angled at a hitch angle γ. The hitch angle γ is defined by the difference between a vehicle heading 8 and a trailer heading 10 about the hitch point 6. When the trailer 4 is angled relative to the vehicle 2 at the hitch angle γ, it may be challenging for the operator of the vehicle to predict a necessary distance traveled and resulting direction to align the vehicle 2 and the trailer 4 such that the hitch angle γ approaches zero.

The vehicle 2 may be equipped with a trailer backup assist system 12 configured to control the vehicle during a reversing or backup operation of the trailer 4. The backup assist system 12 is controlled by the operator of the vehicle in response to an interface configured to receive a directional input, for example a steering input apparatus 14 disposed in a passenger compartment 16 of the vehicle 2. The steering input apparatus 14 may be configured to control a reversing operation of the vehicle 2 and the trailer 4 by receiving a rotational input corresponding to the hitch angle γ. As referred to herein, the trailer heading 10 may refer to a trailer heading that will result from a vehicle operator maintaining a current control input into the steering input apparatus 14. The trailer heading 10, the vehicle heading 8, and additional heading information discussed herein may be updated by the trailer backup assist system 12 in response to a detected change in the steering input apparatus 14.

The vehicle 2 is further equipped with a display or screen 18 disposed in the passenger compartment 16. The screen 18 is operably coupled to a display controller 20. In response to the trailer hitch angle γ and other kinematic properties of the vehicle 2 and the trailer 4, the display controller 20 is operable to determine a predicted heading direction of the vehicle 2 and the trailer 4 in an aligned configuration, such that the hitch angle γ is approximately zero. The display controller 20 is further operable to generate and display a graphical representation of the vehicle heading 8, the trailer heading 10 including the predicted heading on the screen 18. The graphical representation provides a reference for the vehicle operator to utilize to ensure safe operation of the steering input apparatus to maneuver the vehicle 2 and the trailer 4.

Figure 2:
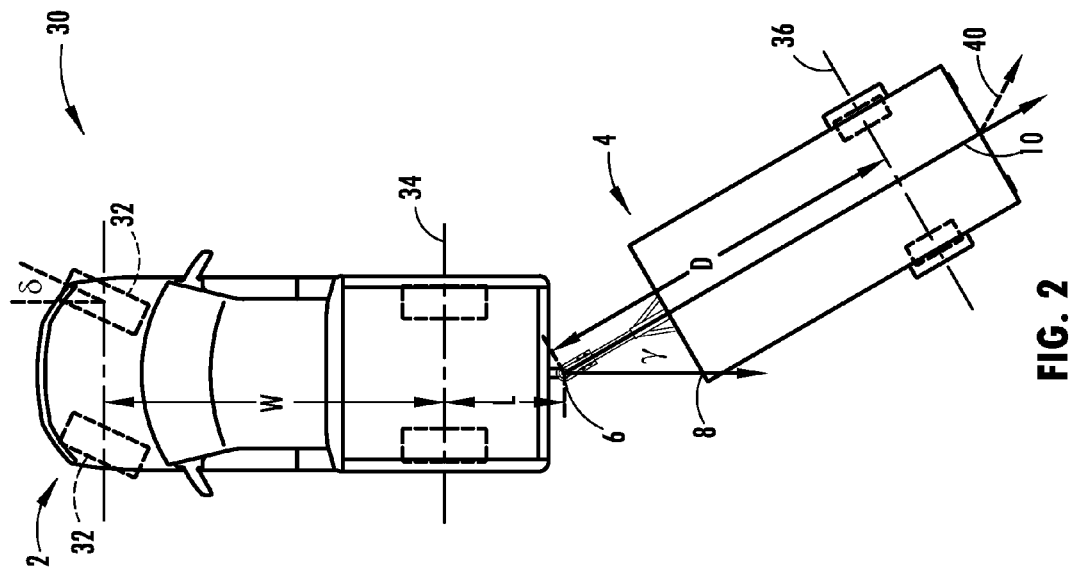
FIG. 2 is a diagram demonstrating a kinematic model of a vehicle and a trailer.

Referring to FIG. 2, a kinematic model 30 of the vehicle 2 coupled to the trailer 4 is shown. The kinematic model 30 is based on various parameters associated with the vehicle 2 and the trailer 4. The kinematic model 30 parameters include:
  δ: steering angle at front wheels 32 of the vehicle 2;
  γ: hitch angle between the vehicle 2 and the trailer 4;
  W: wheel base of the vehicle 2;
  L: length between a hitch point 6 and a rear axle center-line 34 of the vehicle 2; and
  D: length between hitch point 6 and a trailer axle center-line 36, wherein the position of the trailer axle center-line 36 may be an effective, or equivalent, axle length for a trailer having a multiple axle configuration.

The kinematic model 30 of FIG. 2 relates the dimensions of the vehicle 2 and the trailer 4 with the steering angle δ and the hitch angle γ. The steering angle δ and the hitch angle γ may be measured by a plurality of sensors of the trailer backup assist system 12 as discussed in further detail in reference to FIG. 3. From the kinematic model 30, the estimated change in the trailer heading 10 for a given change in the vehicle heading 2 may be determined from the following equation. The change in the trailer heading is denoted as $\sigma_\zeta$ in response to a heading change $\zeta$ of the vehicle heading 8.

$$\sigma_\zeta = a\sin\left(\frac{\sqrt{\left(\frac{W}{\sin(\delta)}\right)^2 - W^2 + L^2}}{D} * \zeta * \sin\left(\gamma - a\sin\left(\frac{L}{\sqrt{\left(\frac{W}{\sin(\delta)}\right)^2 - W^2 + L^2}}\right)\right)\right)$$

Further, a new hitch angle $\gamma_{new}$ in response to a heading change $\zeta$ of the vehicle heading 8, is denoted as follows.

$$\gamma_{new} = \gamma - \sigma_\zeta$$

The total change in trailer heading 10 and a distance to achieve alignment of the vehicle 2 and the trailer 4 is estimated by iterating $\sigma_\zeta$ and $\gamma_{new}$ from an initial hitch angle $\gamma_{original}$ until an aligned hitch angle $\gamma_{new} \approx 0$. An accumulated change in the trailer heading τ is determined to calculate a predicted heading 40 of the vehicle 2 and the trailer 4 when the hitch angle γ is approximately zero. The accumulated change in the trailer heading τ is determined as the sum of the iterations of $\sigma_\zeta$ as follows.

$$\tau = \left( \sum_{\gamma_{original}}^{\gamma_{new}=0} \sigma_\zeta \right)$$

Further, the distance traveled $D_{vehicle}$ by the vehicle 2 is calculated using the sum of the heading changes $\zeta$ of the vehicle heading 8.

$$D_{vehicle} = \frac{W}{\mathrm{SIN}\delta} * \left( \sum_{\gamma_{original}}^{\gamma_{new}=0} \zeta \right)$$

The predicted heading 40 and the distance traveled $D_{vehicle}$ by the vehicle 2 may be utilized by the display controller 20 in a variety of ways. In some implementations, the predicted heading 40 or trajectory is demonstrated on the screen 18 by the display controller 20 relative to the vehicle heading 8 and the trailer heading 10 to provide a visual reference to the operator of the vehicle. The display controller 20 may also be operable to overlay a graphical representation of the predicted heading 40, as well as the vehicle heading 8 and the trailer heading 10, on images of the environment surrounding the vehicle 2 and the trailer 4. The images may be captured by an imaging device in communication with the display controller 20. The display controller 20 may also be operable to fuse image data from a plurality of imaging devices and/or utilize satellite imagery to generate an aerial view of the vehicle 2 and the trailer 4. The display controller 20 may overlay a graphical representation of the predicted heading 40, the vehicle heading 8, and the trailer heading 10 as a reference for the operator of the vehicle to aid the operator in maneuvering the vehicle 2 and the trailer 4.

Figure 3:
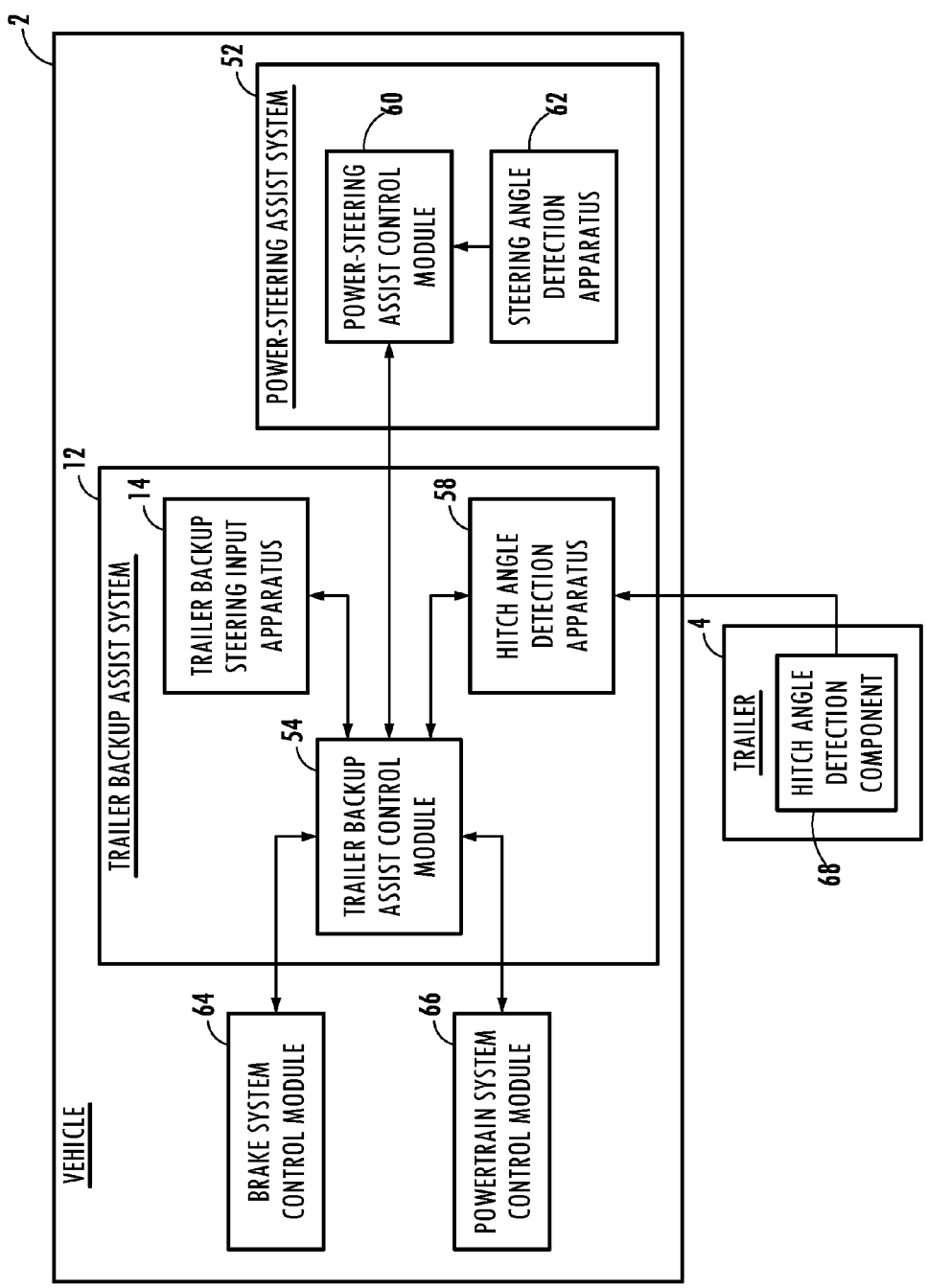
FIG. 3 is a block diagram of a trailer backup assist system.

Referring to FIG. 3, a block diagram of a trailer backup assist system 12 of the vehicle 2 is shown. The trailer backup assist system 12 is operable to control the curvature of path of the trailer 4 by adjusting the vehicle in response to the steering input apparatus 14. The backup assist system 12 operates by controlling the steering of the vehicle 2 via a power steering assist system 52 of the vehicle 2. The steering input apparatus 14 may comprise a touchscreen, knob or other various forms of input devices, and in some implementations may be in communication with a human machine interface (HMI) coupled to the screen 18.

The trailer backup assist system 12 includes a trailer backup assist control module 54, the trailer backup steering input apparatus 14, and a hitch angle detection apparatus 58. The trailer backup assist control module 54 is in communication with the trailer backup steering input apparatus 14 and the hitch angle detection apparatus 58. The trailer backup assist system control module 54 is further in communication with a power steering assist control module 60 and may be indirectly in communication with a steering angle detection apparatus 62 of the power steering assist system 52. The trailer backup assist system may also in communication with a brake system control module 64 and a powertrain control module 66 for controlling motion of the vehicle 2 and the trailer 4.

The trailer backup assist control module 54 (e.g., a trailer curvature algorithm thereof) is operable to generate vehicle steering information as a function of information received from the trailer backup steering input apparatus 14, the hitch angle detection apparatus 58, the power steering assist control module 60, the brake system control module 64, and the powertrain control module 66. In operation, the trailer backup assist control module 54 is operable to maneuver the vehicle 2 to achieve a commanded curvature of a path for the trailer 4. The path of travel and the hitch angle γ are adjusted in response to an operator input into the steering input apparatus 14. The control module is further operable to adjust the hitch angle γ of the trailer 4 relative to the vehicle in response to a hitch angle γ received from the hitch angle detection apparatus 58. Further detailed implementations of a trailer backup assist module are described in further detail in U.S. patent application Ser. No. 14/294,489, which is incorporated herein by reference in its entirety.

The hitch angle detection apparatus 58 may operate in conjunction with a hitch angle detection component 68 which may be coupled to the vehicle 2 or the trailer 4. The hitch angle detection apparatus 58 may be utilized in combination with the hitch angle detection component 68 to communicate information relating to the hitch angle γ to the trailer backup assist control module 54. The hitch angle detection apparatus 58 may be implemented by proximity or distance sensors (e.g an ultrasonic sensor), a camera-based sensor configured to visually monitor a target, or any angular measurement device. The hitch angle detection apparatus 58 may also be implemented as a device mounted proximate the hitch point 6 to measure the hitch angle γ. The trailer backup assist system 12 as discussed herein provides an intuitive system for maneuvering the vehicle 2 and the trailer 4 by monitoring and controlling the hitch angle γ during a reverse operation.

Figure 4:
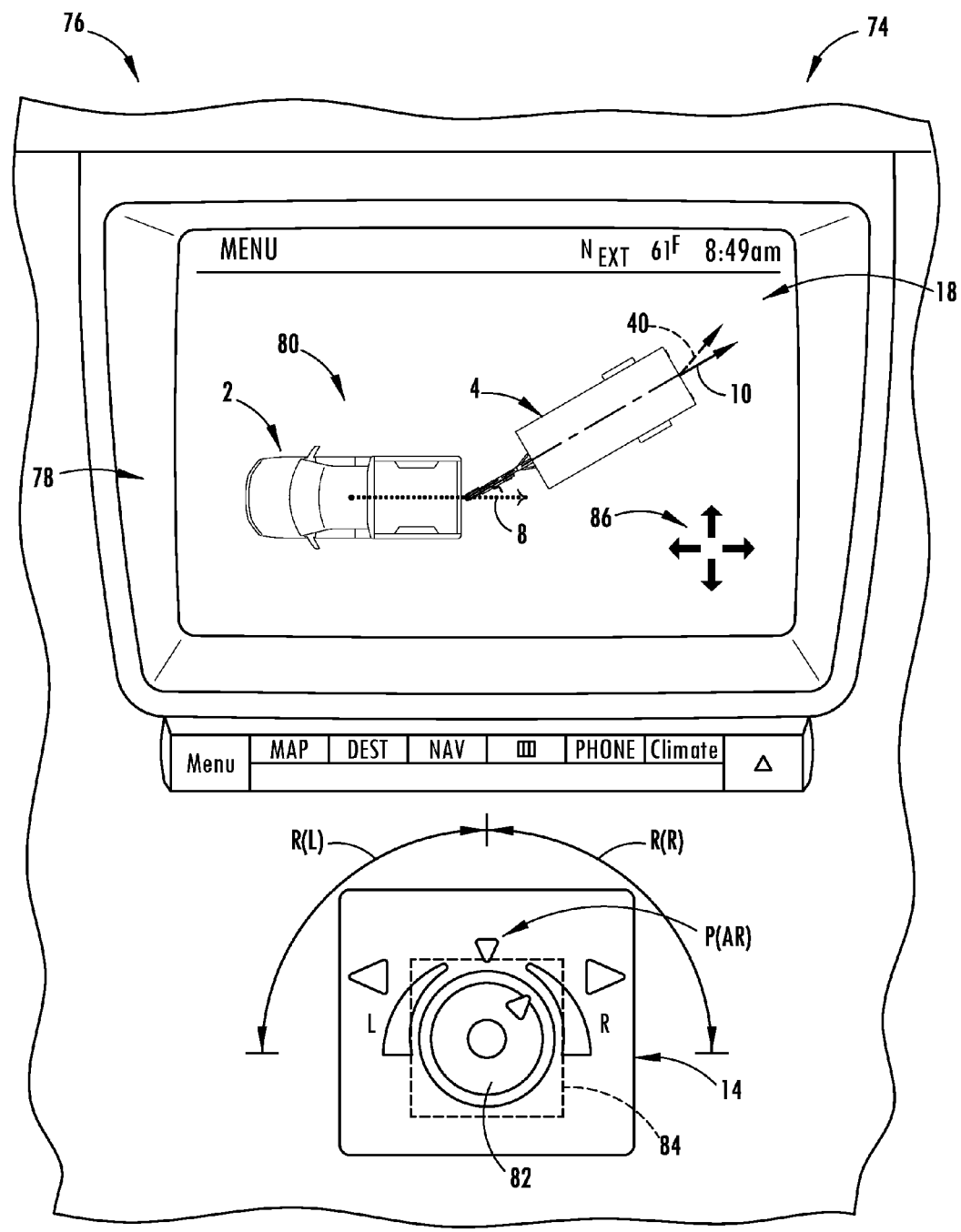
FIG. 4 is a diagram of a center console of a vehicle comprising a steering input apparatus.

Referring now to FIG. 4, the steering input apparatus 14 is shown as a component of an interface 74 configured to receive a directional input to control the trailer backup assist system 12. The steering input apparatus 14 may be disposed in a center console portion 76 of the passenger compartment 16 of the vehicle 2 as an input device in communication with an HMI 78. The HMI 78 may further be in communication with the display controller 20 and the screen 18 to provide the operator of the vehicle 2 with reference information generated by the display controller 20. The reference information may include a graphical representation 80 of the vehicle 2 and the trailer 4 including the predicted heading 40 to assist the operator of the vehicle in utilizing the steering input apparatus 14.

In some implementations, the steering input apparatus 14 may comprise a rotatable control element in the form of a knob 82. The knob 82 is further coupled to a movement sensing device 84. The knob 82 may be biased (e.g., by a spring return) to an at-rest position P(AR) between opposing rotational ranges of motion R(R), R(L). A force that biases the knob 82 toward the at-rest position P(AR) can increase (e.g., non-linearly) as a function of the amount of rotation of the knob 82 with respect to the at-rest position P(AR). Even in a spring biased configuration, an operator may have difficulty determining a relative position of the knob 82 and a corresponding trailer heading 10 in response to an input. Further, an operator may have difficultly determining the predicted heading 40 of the vehicle 2 and the trailer 4 when the trailer angle γ is aligned. The graphical representation 80 provides visual feedback to the operator to improve the intuitive nature of the steering input apparatus 14.

For example, as shown in FIG. 4, the knob 82 is rotated in the direction of the right rotational range R(R). In response to the rotation detected by the sensing device 84 of the steering input apparatus 14, the trailer backup assist control module 54 has positioned the vehicle such that the trailer 4 is angled toward a passenger side of the vehicle 2 as shown in the graphical representation 80. To assist the driver in operation of the vehicle 2, the display controller 20 includes the vehicle heading 8, the trailer heading 10, and the projected heading 40, as calculated based on the steering angle δ and the hitch angle γ in reference to FIG. 2. The projected heading provides the operator of the vehicle 2 with a visual reference of the projected heading 40 of the vehicle 2 and the trailer 4 in an aligned configuration (e.g. γ≈0). The projected heading 40 may notify the operator of the vehicle 2 of a resulting position of the vehicle 2 and the trailer 4 in response to adjusting the knob 82 to the at-rest position P(AR).

Though the steering input apparatus is discussed in detail in reference to the knob 82 and a corresponding rotating configuration, the steering input apparatus may be implemented by any form of user input configured to direct the vehicle 2 and the trailer 4. For example, in some implementations, the screen 18 may be configured as a touchscreen. The touchscreen may be of any type suited to a particular application and may be resistive, capacitive, surface acoustic wave, infrared, or optical. The touchscreen may utilize a plurality of soft keys in communication with the display controller 20 and the trailer backup assist system 12 to select a location or path for the vehicle 2 and the trailer 4. The touchscreen may further provide options for the operator to select the vehicle 2 or the trailer 4 and control a direction of each via a plurality of directional inputs 86.

In some implementations, the HMI 78 may provide feedback to an operator of the vehicle 2 while the operator is waiting for the vehicle 2 to complete a command received by the trailer backup assist control module 54. For example, the HMI 78 may provide feedback to the operator during control tasks and maneuvers of the vehicle 2 and the trailer 4 that may require an extended period to execute. In this way, the HMI 78 may provide a reassurance to the driver that the trailer backup assist control module 54 is functioning properly. The feedback may also serve to limit an operator from prematurely adjusting an input to the steering input apparatus 14 prior to the completion of a control task.

The HMI 78 and the knob 82 may be configured to provide feedback to the operator of the vehicle 2 in a variety of ways. For example, a notification may be displayed on the screen 18 showing a remaining change in the trailer heading 10 prior to the trailer heading 10 becoming aligned with the predicted heading 40. In some implementations, the remaining change in the trailer heading 10 may be displayed numerically on the screen 18 as an angle. The remaining change may also be displayed by updating the graphical representation 80 and/or the direction of the arrows denoting the trailer heading 10 and the predicted heading 40. The graphical representation 80 may further be configured to flash on and off during the completion of a control task. One or more icons or symbols may also be overlaid on the screen notifying the operator that the trailer backup assist system 12 is active.

The operator of the vehicle 12 may further be provided feedback for a turning operation of the trailer backup assist system 12 by audible or tactile feedback that may be provided by the HMI 78 and or additional systems in the vehicle 2. In some implementations, a steering wheel of the vehicle may vibrate or oscillate in response to conditions requiring that the steering angle δ be maintained at a maximum steering angle to complete a steering maneuver. Also, periodic audible tones may be provided through one or more speakers in the vehicle 2. The audible tones may increase in frequency as the vehicle heading 8 approaches a maximum angle with the trailer heading 10 (e.g. a jack knife condition). As the hitch angle γ decreases, the audible tone may change from continuous or high frequency tones to less frequent tones until the hitch angle γ is approximately zero and the tone stops.

In some implementations, an estimated time required at a given speed may be displayed on the screen 18 providing a notification of the time required for the trailer heading 10 to become aligned with the predicted heading 40. While the vehicle is traveling, the estimated time may be updated to demonstrate a time required for the trailer heading 10 to reach the predicted heading 40. In yet another implementation, a graph may be displayed on the screen 18 in the form of directional arrows demonstrating the trailer heading 10 in comparison to the predicted heading 40. Further descriptions of systems and methods configured to provide feedback to an operator of the vehicle 2 are discussed in reference to FIGS. 7-9. Each of the visible, tactile, and audible notifications discussed herein may provide the operator of the vehicle 2 with feedback to notify the operator that the trailer backup assist system 12 is functioning properly.

Figure 5:
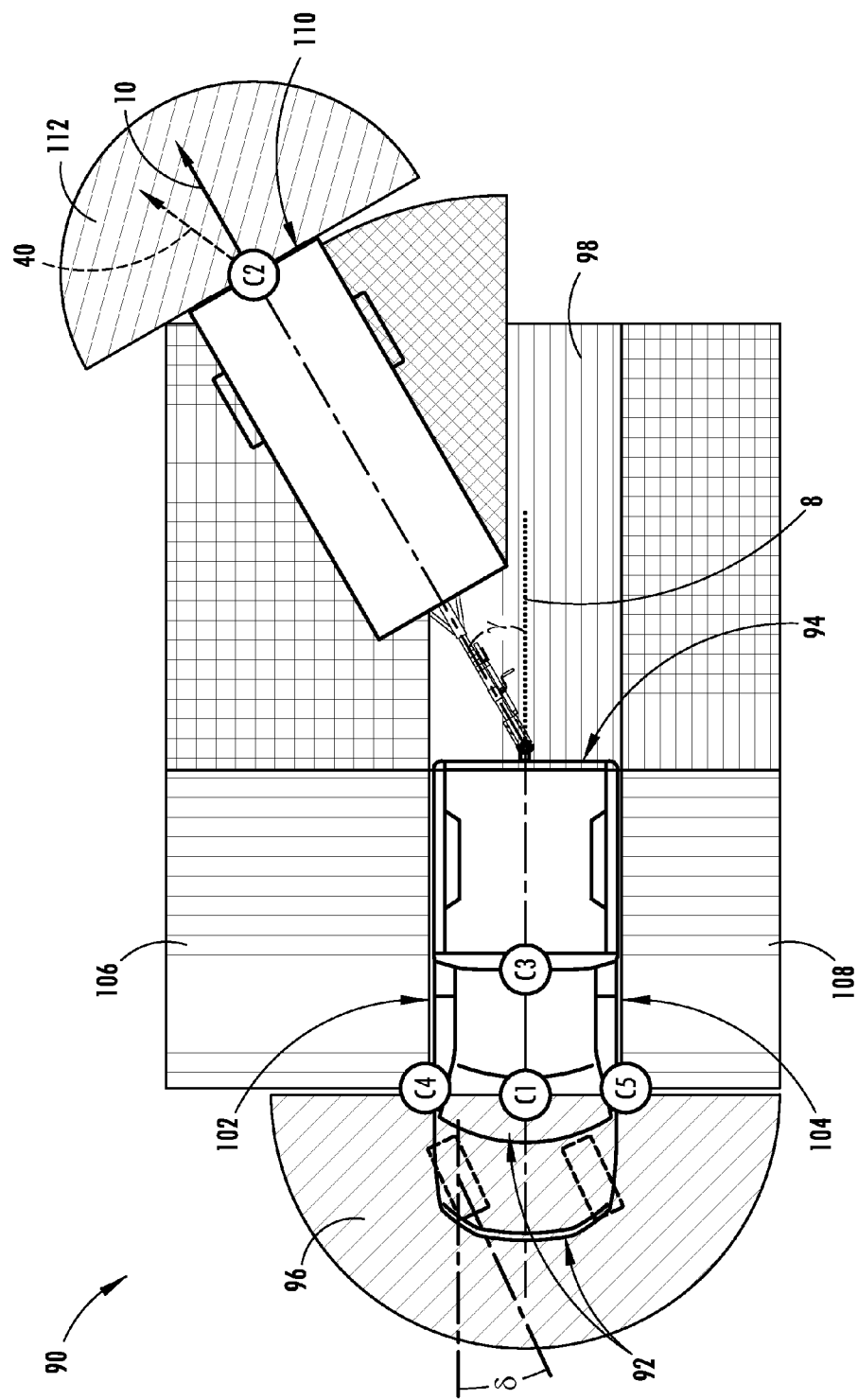
FIG. 5 is an aerial view of a vehicle and a trailer including a plurality of imaging devices.

As demonstrated in FIG. 5, in some implementations, the vehicle 2 and the trailer 4 may include one or more imaging devices C1-C5. The imaging devices C1-C5 may be arranged in various locations such that each field of view of the imaging devices C1-C5 is configured to capture a significantly different portion of a surrounding environment 90. Each of the imaging devices C1-C5 may comprise any form of device configured to capture image data including Charge Coupled Devices (CCD) and Complementary Metal Oxide Semiconductor (CMOS) image sensors. Though five imaging devices are discussed in reference to the present implementation, the number of imaging devices may vary based on the particular operating specifications of the particular imaging devices implemented and the proportions and/or exterior profiles of a particular vehicle and trailer.

The imaging devices C1, C3, C4, and C5 are disposed on the vehicle 2 and oriented such that each field of view of the imaging devices is directed toward a substantially different region of the environment 90. A first imaging device C1 is disposed centrally on a forward facing portion 92. A third imaging device C3 is disposed centrally on a rear facing portion 94 of the vehicle 2. In addition to the third imaging device C3, or alternatively, an imaging device may be disposed centrally proximate a tailgate of the vehicle 2. The imaging devices C1 and C3 are oriented such that a first field of view 96 of the first imaging device C1 and a third field of view 98 of the third imaging device C3 are configured to view substantially all of the environment 90 in the fore and aft directions relative to the vehicle 2.

The imaging devices C4 and C5 are disposed on a passenger's side 102 and a driver's side 104 of the vehicle 2 respectively and are configured to capture image data corresponding to the environment 90 to the sides and rear of the vehicle 2. The fourth imaging device C4 is configured to capture image data in a fourth field of view 106 and the fifth imaging device C5 is configured to capture image data in a fifth field of view 108. Further, a second imaging device C2 may be located centrally on a rear facing portion 110 of the trailer 4 and may be configured to operate in combination with the imaging devices C1 and C3-C5 to provide a combined field of view of the environment 90 surrounding the vehicle 2 and the trailer 4. The second imaging device C2 may be configured to capture image data in a rearward facing field of view 112 relative to the trailer 4.

In some implementations, image data from the fields of view of each of the imaging devices C1-C5 may be utilized by the display controller 20 to generate a view of the environment 90 surrounding the vehicle 2 and the trailer 4 including the vehicle heading 8, the trailer heading 10, and/or the predicted heading 40. The image data captured by the imaging devices C1-C5 may also be combined by the display controller 20 to form a composite aerial view or bird's eye view of the vehicle 2 and the trailer 4. The composite aerial view may also be generated by the display controller 20 from satellite image data 182 corresponding to a location of the vehicle 2. In the various implementations discussed herein, the display controller 20 may be configured to combine various image data and graphical representations of the vehicle 2 and the trailer 4 to provide the vehicle operator with a visual reference to determine the predicted heading 40 of the vehicle 2 and the trailer 4 in an aligned configuration.

Figure 6:
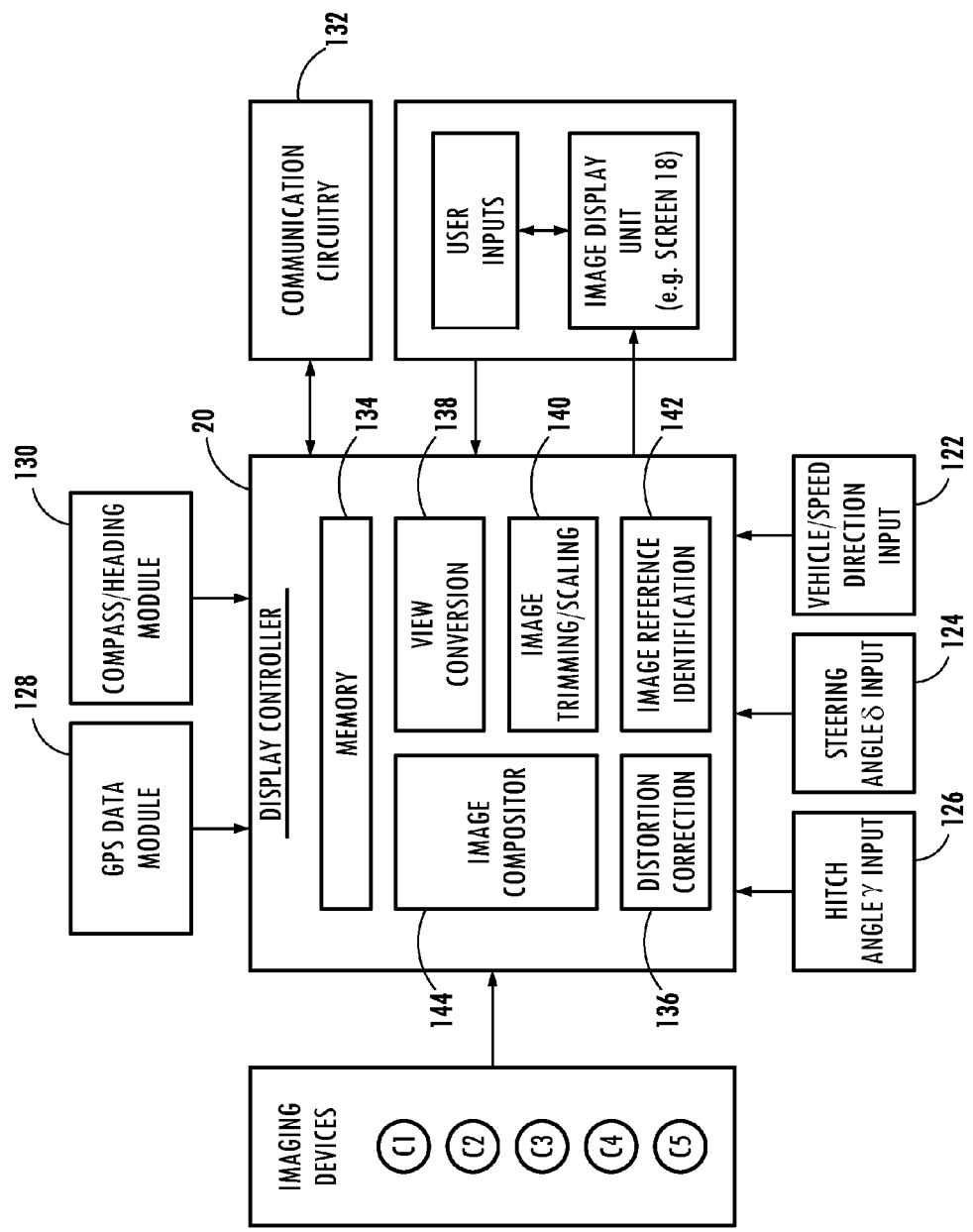
FIG. 6 is a block diagram of a display controller in communication with a plurality of imaging devices.

Referring now to FIG. 6, a block diagram of the display controller 20 is shown. The display controller 20 may be combined or in communication with the trailer backup assist control system 12 as discussed herein. The image data from the imaging devices C1-C5 may be received and processed by the display controller 20 to generate image data for display on the screen 18. The display controller 20 is in communication with a plurality of data collection devices and/or modules as discussed previously in reference to the trailer backup assist control system 54. The display controller 20 is configured to receive information corresponding to the velocity V, the steering angle δ, and the hitch angle γ between the vehicle 2 and the trailer 4.

A velocity and direction input 122 may be configured to receive the velocity V and directional information of the vehicle 2 from the powertrain control module 66. A steering angle data input 124 may be configured to receive the steering angle δ of the vehicle from the power steering assist control module 60. A hitch angle data input 126 may be configured to receive the hitch angle γ from the hitch angle detection apparatus 58. Though the data inputs are described as being received from the specific hardware device (e.g. the power steering assist module 60), the data inputs may be received from any devices implemented by the trailer backup assist control module 54 to monitor the kinematic properties of the vehicle 2 and the trailer 4. Each of the data inputs may be sampled by the display controller 20. For example, each of the data inputs may be sampled multiple times per second to update the values of V, δ, and γ.

The display controller 20 may further be in communication with a GPS data module 128 and a compass/heading module 130. The GPS data module 128 may be operable to determine a global position of the vehicle 2 and communicate the position to the display controller 20. The compass/heading module 130 may be operable to determine the heading direction of the vehicle 2 relative to a geographic compass direction and communicate the heading direction to the display controller 20. When combined, the global positioning data from the GPS data module 128 and the heading data from the compass/heading module 130 may be utilized by the display controller 20 to determine the position and heading of the vehicle 2. The compass/heading module 130 is only one of several alternatives for obtaining the heading. For example, the heading may be inferred by the controller 20 from visual odometery and/or wheel odometry from a count of a wheel speed sensor.

In some implementations, the position and heading of the vehicle 2 may further be utilized by the display controller 20 to request satellite image data 182, feature data, topographic data, landmark data, and any other data corresponding to the environment 90 for the determined position and heading of the vehicle 2. The display controller 20 may request the data (e.g. the satellite image data 182) via a communication circuitry 132 operable to wirelessly transmit and receive data. The communication circuitry 132 includes a radio frequency transmitter and receiver for transmitting and receiving signals. The signals may be configured to transmit data and may correspond to various communication protocols. The communication circuitry 132 may be configured to operate in a mobile communications system and may be used to send and receive data and/or audiovisual content. Receiver types for interaction with the communication circuitry 132 may include GSM, CDMA, WCDMA, GPRS, MBMS, WiFi (e.g. wireless local area networks), WiMax (broadband wireless), DVB-H, ISDB-T, etc., as well as advanced communication protocols that may be developed at a later time.

The display controller 20 may comprise a memory 134, and a plurality of modules, circuits, and/or processors configured to calculate the predicted heading 40 of the vehicle 2 and the trailer 4. The display controller 20 may further be operable to process image data received from the imaging devices C1-C5. The plurality of modules may further be utilized to combine the image data received from the imaging devices C1-C5 with satellite image and/or feature data. The image data and/or satellite data may also be combined with rendered graphics 164 of the vehicle heading 8, the trailer heading 10, and the predicted heading 40 to form various composite views of the environment 90 surrounding the vehicle 2 and the trailer 4. The plurality of modules may include a distortion correction module 136, a view conversion module 138, an image trimming/scaling module 140, an image reference identification module 142, and an image compositor 144.

To generate a composite view combining image data corresponding to two or more of the imaging devices C1-C5, the display controller 20 may receive image data from the imaging devices C1-C5 and correct any distortion in the image data with the distortion correction module 136. Distortion in the image data may be the result of lens distortion, viewpoint correction, or any other form of distortion common to imaging devices. The view conversion module 138 may then convert a viewpoint of the image data. A viewpoint correction may correspond to altering the orientation of a perspective of the image data. For example, the image data may be adjusted from a side view to an aerial view. The image data from two or more of the imaging devices C1-C5 may then be trimmed and scaled by the image trimming/scaling module 140 and combined in the image compositor 144.

The composite image data output by the compositor 144 may form an expanded field of view combining the image data received from 2 or more of the imaging devices C1-C5 to provide an improved view of the environment 90 surrounding the vehicle 2 and the trailer 4. The image data received from the imaging device C1-C5 and/or the satellite image data received from the communication circuitry 132 may be utilized by the display controller 20 to generate various views of the vehicle 2 and the trailer 4. The views of the environment 90 surrounding the vehicle 2 and the trailer 4 may then be combined with the graphical representations of the vehicle and the trailer 4 to provide feedback to the operator of the vehicle 2. In particular, the graphical representations may include the predicted heading 40 or trajectory of the vehicle 2 and the trailer 4 as discussed in reference to FIGS. 7-9.

Figure 7:
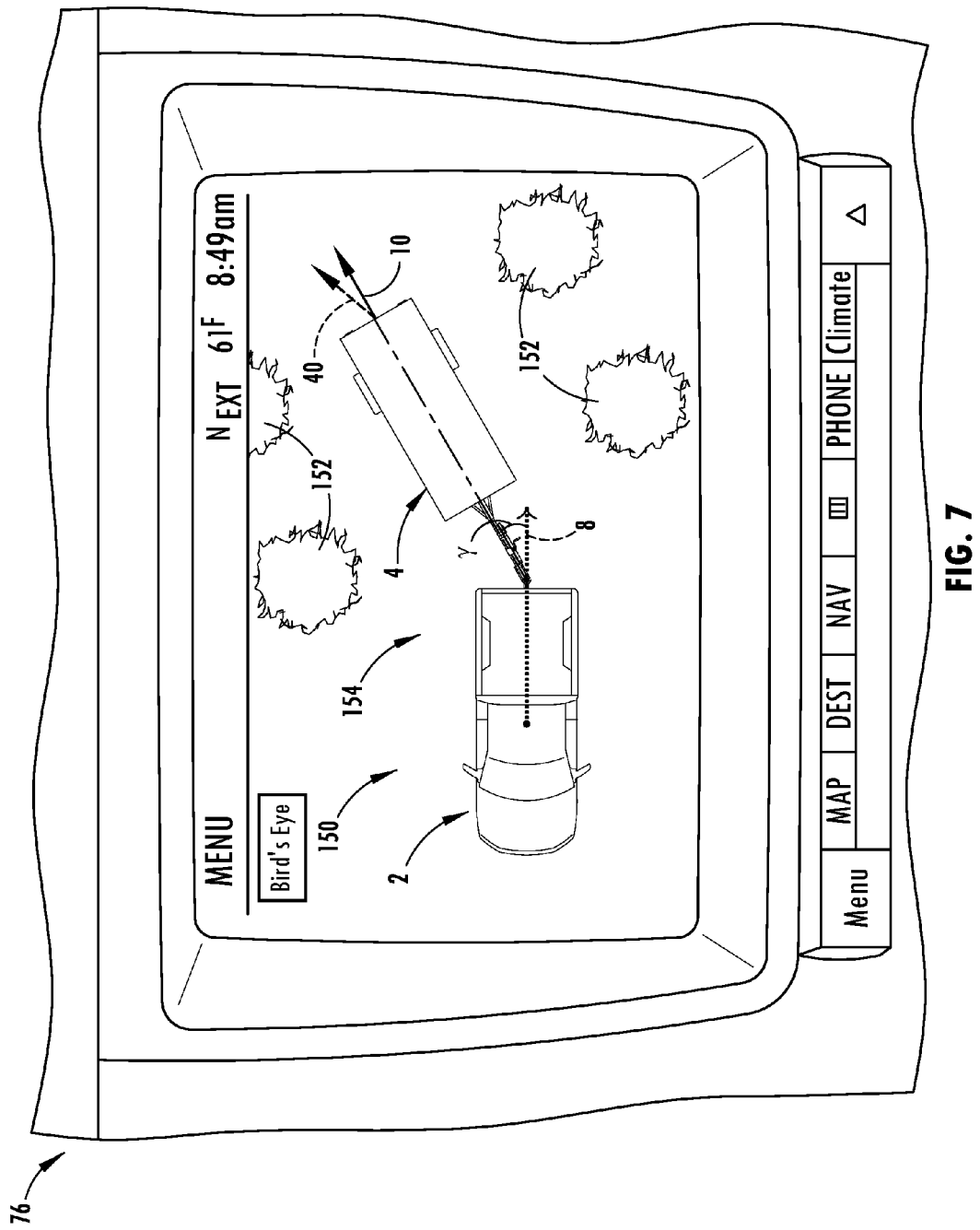
FIG. 7 is a diagram of an interface of a vehicle demonstrating a graphical representation of a vehicle and a trailer including a predicted heading.

Referring now to FIG. 7, an aerial view 150 of the vehicle 2 and the trailer 4 displayed on the screen 18 of the HMI 78 is shown. In some implementations, the display controller 20 is configured to generate the aerial view 150 based on the composite image data from the plurality of imaging device C1-C5 and/or satellite image data corresponding to the GPS location of the vehicle 2. The aerial view 150 may further include environmental features 152 that may be designated in the satellite image data and/or identified by the display controller 20 from the image data captured by the plurality of imaging devices C1-C5. U.S. patent application Ser. No. 14/289,888 includes further details of a controller operable to identify the environmental features 152 and is incorporated by reference herein in its entirety.

The aerial view 150 includes a graphical representation 154 of the vehicle 2 and the trailer 4. The graphical representation 154 demonstrates the vehicle heading 8, the trailer heading 10, and the predicted heading 40 of the vehicle 2 and the trailer 4 in an aligned configuration. As illustrated in FIG. 7, the predicted heading 40 is shown relative to the vehicle 2 and the trailer 4 to assist the operator of the vehicle in utilizing the steering input apparatus 14. The predicted heading 40 provides valuable information to the operator of the vehicle 2 to predict a direction of the vehicle 2 and the trailer 4 in the aligned configuration in response to the steering input apparatus 14 being adjusted to an aligned configuration. For example, the predicted heading 40 may provide the operator with advanced knowledge of a response of the trailer backup assist system 12 in response to adjusting the knob 82 to the at-rest position P(AR).

Figure 8:
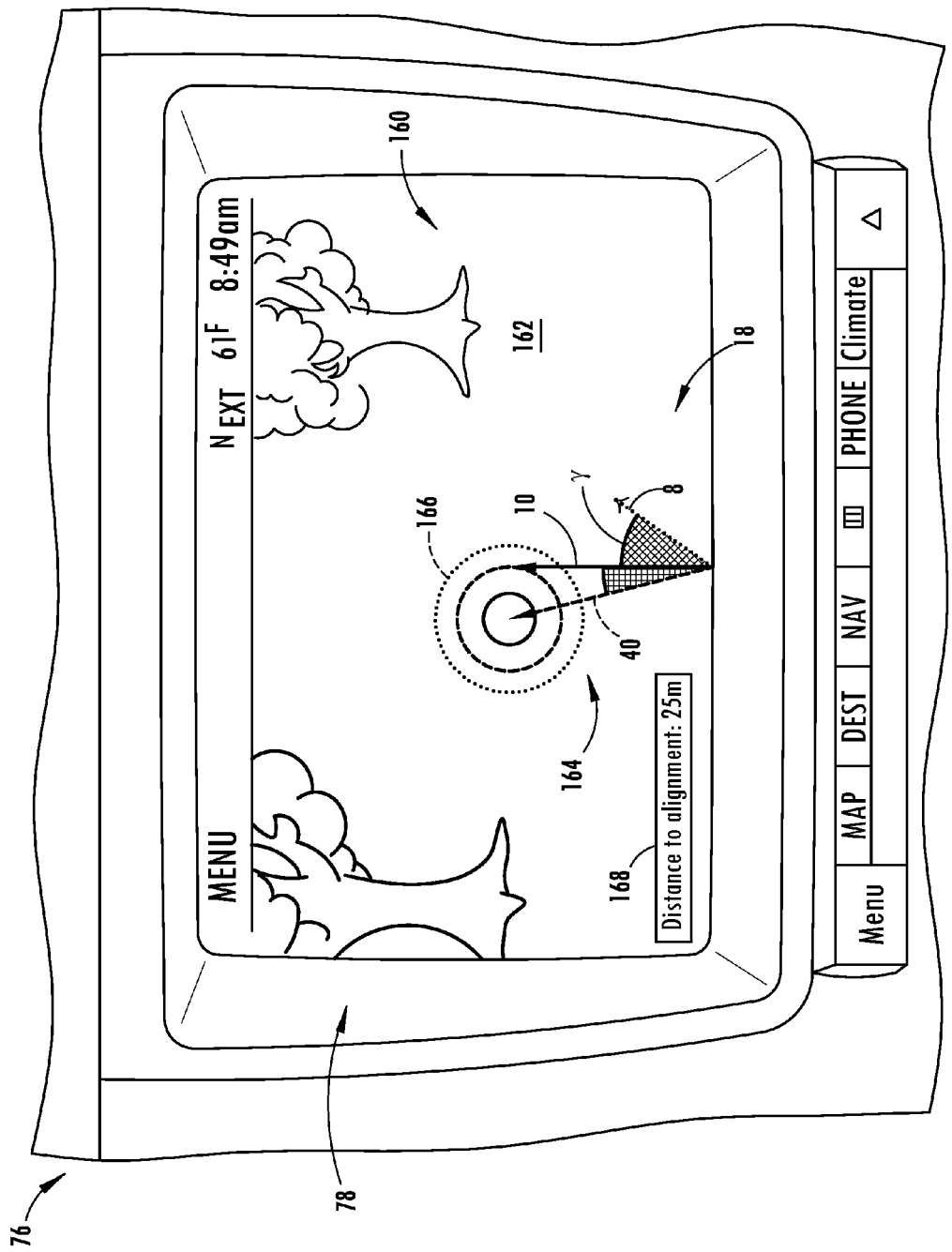
FIG. 8 is a diagram of an interface of a vehicle demonstrating image data from a rear facing imaging device including a graphical representation of a vehicle heading, a trailer heading, and a predicted heading.

Referring now to FIG. 8, a rear-facing view 160 of an environment 162 behind the trailer 4 is shown displayed on the screen 18 of the HMI 78. The rear-facing view 160 may correspond to image data captured by the second imaging device C2. In some implementations, the display controller 20 is configured to overlay rendered graphics 164 over the rear-facing view 160 to demonstrate the vehicle heading 8, the trailer heading 10, and the predicted heading 40. The rendered graphics 164 may be communicated by the display controller 20 to the screen 18 in the form of directional arrows. The rendered graphics 164 may demonstrate the vehicle heading 8, the trailer heading 10, and the predicted heading 40 in reference to the rear-facing view 160 to provide the operator of the vehicle with a visual reference of the response of the trailer backup assist system 12 to an aligned configuration. The information presented by the display controller to the operator of the vehicle 2 provides a beneficial reference of the predicted heading 40 of the vehicle 2 and the trailer 4 in an aligned configuration.

In some implementations, the predicted heading 40 may also be modeled by the display controller 20 as a target, for example a bull's-eye 166. In the various implementations of the display controller 20 and the display system for the vehicle 2 and the trailer 4 as described herein, the predicted heading 40 may be identified by a variety of markers or symbols that may be overlaid on the rear-facing view 160, an aerial view 150, or any other views generated by the display controller 20. Further, the distance traveled $D_{vehicle}$ by the vehicle 2 may be displayed on the screen 18 as a reference to the operator demonstrating a distance to alignment 168 of the vehicle 2. The information displayed on the screen 18 by the display controller 20 may be utilized to improve the understanding and utilization of the trailer backup assist system 12 for improved accuracy and increased convenience.

Figure 9:
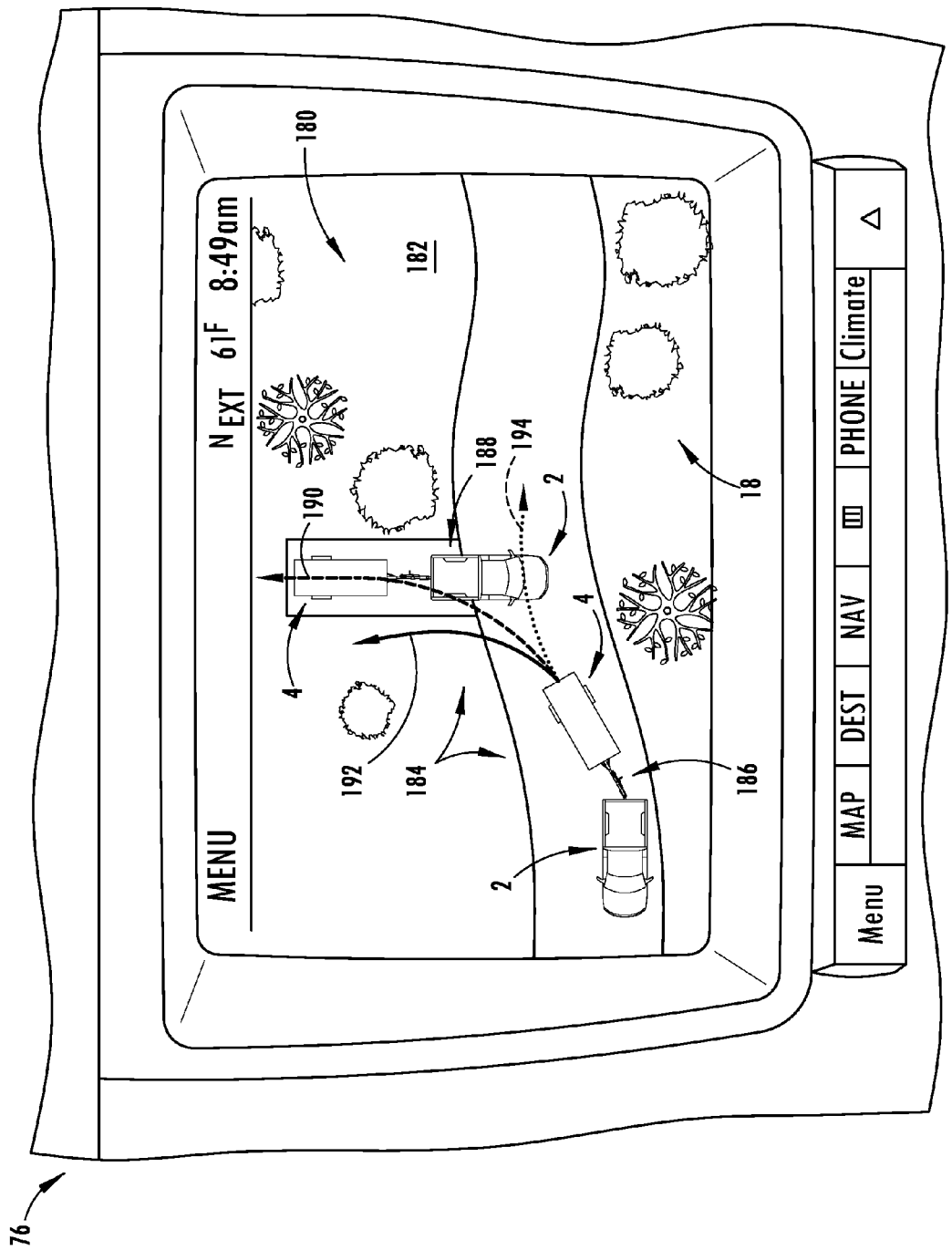
FIG. 9 is a diagram of an interface of a vehicle demonstrating satellite data including a graphical representation of the vehicle and a trailer in accordance with the disclosure.

Referring now to FIG. 9, an aerial view 180 of the vehicle 2 and the trailer 4 displayed on the screen 18 of the HMI 78 is shown. The aerial view 180 is generated by the display controller 20 from satellite image data 182 corresponding to the location of the vehicle 2. As discussed in reference to FIG. 6, the display controller 20 is operable to determine the position and heading of the vehicle 2 from global positioning data from the GPS data module 128 and the heading data from the compass/heading module 130. Based on the position and heading, the display controller 20 may access satellite image data 182 via the communication circuitry 132 to generate the aerial view of the vehicle 2 and the trailer 4. The vehicle 2 and the trailer 4 are demonstrated as rendered graphics 184 overlaid on the satellite image data 182.

In some implementations, the display controller 20 may be operable to display a current position 186 of the vehicle 2 and the trailer 4 as well as a projected position 188 of the vehicle 2 and the trailer 4. The current position 186 of the vehicle 2 and the trailer 4 are generated based on the position and heading of the vehicle 2 as well as the hitch angle γ. The projected position 188 of the vehicle 2 and the trailer 4 are determined by the display controller 20 based on the distance traveled $D_{vehicle}$ by the vehicle 2 and the projected heading 40 of the vehicle 2 and the trailer 4 in the aligned configuration (e.g. γ∞0). The projected position 188 of the vehicle 2 and the trailer 4 may provide additional reference information to aid the operator of the vehicle in visualizing a predicted path based on the projected heading 40.

As illustrated in FIG. 9, the projected heading 40 is further illustrated as a projected curve 190 representing the change in the trailer heading $\sigma_\xi$ for the iterative calculations of the new hitch angle $\gamma_{new}$. As discussed in reference to FIG. 2, the projected heading 40 is calculated as the sum of the iterations of the trailer heading $\sigma_\xi$. As such, the display controller 20 is operable to model the changes in the trailer heading $\sigma_\xi$ to generate the projected curve 190. Further, by calculating the distance traveled $D_{vehicle}$ by the vehicle 2, the display controller 20 is operable to model the projected position 188 of the vehicle 2 and the trailer 4. The projected position 188 is displayed on the screen 18 in the aligned configuration to demonstrate the projected heading of the vehicle 2 and the trailer 4 in the projected position 188.

In addition to the projected curve 190, the display controller 20 is further operable to display a current heading path 192 and an alternate heading path 194. The current heading path 192 demonstrates a path of the trailer 4 based on a user input remaining at a current input direction and magnitude. For example, the current input direction and magnitude may correspond to the knob 82 being rotated at a consistent degree of rotation in the direction of the right rotational range R(R). The alternate heading path 194 may correspond to an input from an operator directed in an opposite direction and magnitude of the current input direction. For example, the alternate input direction and magnitude may correspond to the knob 82 being rotated at a consistent degree of rotation in the direction of the left rotational range R(L). In some implementations, the alternate heading path 194 may comprise a maximum heading change that may be overlaid on the screen 18, demonstrating a maximum trailer curvature constraint attainable to aid the driver with the given vehicle wheelbase, drawbar length and effective trailer length. The heading paths discussed herein may be determined by a variety of methods based on the kinematic model 30 of the vehicle 2 and the trailer 4. U.S. patent application Ser. No. 14/294,489 is incorporated herein by reference in its entirety and includes a detailed discussion of various methods and systems operable to determine heading paths of a vehicle coupled to a trailer 4.

Based on the current heading path 192, the projected curve 190, and the alternate heading 194, the systems and methods discussed herein provide the operator of the trailer backup assist system 12 an enhanced view of an environment surrounding the vehicle 2 and the trailer 4. The various systems and methods discussed herein provide a variety of systems to aid an operator of a vehicle coupled to a trailer to determine a direction and position of an aligned configuration of the vehicle and the trailer. The teachings disclosed provide valuable information to the operator of a vehicle to determine a projected heading of the vehicle and a trailer to direct the vehicle and the trailer safely in along a path by providing an intuitive visual feedback system to aid the operator.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A display system for a vehicle and trailer comprising:
   an interface configured to receive a directional input; and
   a controller in communication with the interface and a screen, wherein the controller is operable to:
   receive a hitch angle and determine a requested heading direction of the trailer based on the hitch angle;
   determine a predicted heading for the vehicle and trailer to be aligned based on the hitch angle and a prospective alignment instruction; and
   display the predicted heading of the trailer on the screen.

2. The system according to claim 1, wherein the requested heading direction is controlled in response to the directional input.

3. The system according to claim 1, wherein the controller is configured to adjust the hitch angle in response to an input received by the directional input of the interface.

4. The system according to claim 1, wherein the predicted heading is determined based on a change in the hitch angle in response to a reverse distance traveled by the vehicle.

5. The system according to claim 1, wherein the predicted heading on the screen demonstrates a response of the controller to the directional input directing the controller to orient the vehicle and the trailer in an aligned configuration.

6. The system according to claim 5, wherein the aligned configuration of the vehicle and the trailer corresponds to the hitch angle approaching zero.

7. The system according to claim 1, wherein the predicted heading of the vehicle aligned with the trailer corresponds to a predicted location of the vehicle and the trailer calculated for a straightening operation based on the hitch angle received by the controller.

8. The system according to claim 1, wherein the prospective alignment instruction corresponds to a projected request for the vehicle substantially aligned with the trailer.

9. A vehicle and trailer system comprising:
   a controller in communication with a screen and at least one imaging device, the controller operable to:
   receive a hitch angle between the vehicle and the trailer; and
   display an image demonstrating a current trajectory of the trailer based on the hitch angle and demonstrating a predicted trajectory of the vehicle and trailer aligned in a straightened configuration based on the hitch angle and a projected alignment instruction.

10. The system according to claim 9, wherein the straightened configuration is based on a repositioning operation of the vehicle controlled by the controller configured to substantially align the vehicle with the trailer.

11. The system according to claim 10, wherein the repositioning operation comprises the controller adjusting a steering angle of the vehicle while the vehicle is traveling in a reverse direction.

12. The system according to claim 10, wherein the repositioning operation is processed by the controller in response to a user input configured to control the hitch angle to align the vehicle with the trailer.

13. The system according to claim 9, further comprising:
   updating the predicted trajectory of the trailer in response to a change in at least one of the steering angle and the hitch angle to provide feedback on the screen in response to a user input.

14. The system according to claim 9, wherein the controller is further operable to:
   overlay the current trajectory and the predicted trajectory on image data received from the at least one imaging device.

15. The system according to claim 9, wherein the at least one imaging device is disposed proximate a rear portion of the trailer.

16. The system according to claim 9, wherein the controller is further operable to:
   receive an aerial image of a location of the vehicle and overlay an aerial view of the vehicle and the trailer over the aerial image to display features corresponding to the location on the screen.

17. A method for monitoring a trailer trajectory, the method comprising:
   monitoring a hitch angle between a vehicle and the trailer;
   displaying a trailer heading direction on a screen based on the hitch angle and a steering angle of the vehicle;
   based on the hitch angle and steering angle, determining a predicted heading of the vehicle and trailer substantially aligned based on a prospective alignment instruction; and
   displaying the predicted heading on the screen.

18. The method according to claim 17, further comprising:
   overlaying a model of the vehicle and the trailer demonstrating the hitch angle over image data, the image data corresponding to an environment surrounding the vehicle and the trailer.

19. The method according to claim 18, wherein the trailer heading direction and the predicted heading are displayed in reference to the model of the vehicle and the trailer.

20. The method according to claim 17, further comprising:
   updating the predicted heading in response to a change in one of the hitch angle and the steering angle.

* * * * *